US009921707B2

(12) United States Patent
Nakamura et al.

(10) Patent No.: US 9,921,707 B2
(45) Date of Patent: Mar. 20, 2018

(54) OPERATION CONSOLE AND IMAGE PROCESSING APPARATUS WITH THE OPERATION CONSOLE

(71) Applicant: Sharp Kabushiki Kaisha, Osaka-shi, Osaka (JP)

(72) Inventors: Yasushi Nakamura, Osaka (JP); Hidenobu Mandai, Osaka (JP); Kazuhiro Matsuyama, Osaka (JP); Hiroyuki Nagao, Osaka (JP); Kazuhisa Yoneda, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 22 days.

(21) Appl. No.: 14/428,463

(22) PCT Filed: Oct. 15, 2013

(86) PCT No.: PCT/JP2013/077947
§ 371 (c)(1),
(2) Date: Mar. 16, 2015

(87) PCT Pub. No.: WO2014/069232
PCT Pub. Date: May 8, 2014

(65) Prior Publication Data
US 2015/0242026 A1 Aug. 27, 2015

(30) Foreign Application Priority Data

Oct. 30, 2012 (JP) ................................ 2012-238678
Sep. 25, 2013 (JP) ................................ 2013-198299

(51) Int. Cl.
G06F 3/047 (2006.01)
H04N 1/00 (2006.01)
G09G 5/00 (2006.01)

(52) U.S. Cl.
CPC ............. G06F 3/047 (2013.01); G09G 5/003 (2013.01); H04N 1/00384 (2013.01); H04N 1/00411 (2013.01); G09G 2300/0404 (2013.01)

(58) Field of Classification Search
CPC combination set(s) only.
See application file for complete search history.

(56) References Cited

U.S. PATENT DOCUMENTS

2008/0089017 A1 4/2008 Yamada et al.
2009/0198838 A1 8/2009 Murata et al.
(Continued)

FOREIGN PATENT DOCUMENTS

JP 2-37433 U 3/1990
JP 08-273474 A 10/1996
(Continued)

OTHER PUBLICATIONS

Official Communication issued in International Patent Application No. PCT/JP2013/077947, dated Jan. 21, 2014.
(Continued)

Primary Examiner — Van Chow
(74) Attorney, Agent, or Firm — Keating & Bennett, LLP

(57) ABSTRACT

A touch key of an operation console includes a circuit board (310) having a light source (312, 314), a light transmitting portion (322) transmitting light, a non-transparent light shielding portion (324) and a semi-transparent operation panel (300) covering upper surfaces of the light transmitting portion and the light shielding portion. The light transmitting portion accommodates the light source. The surfaces of light transmitting portion and light shielding portion in contact with each other are tightly sealed, and the circuit board (310) and the light shielding portion (324) cover the light transmitting portion (322) such that the light is emitted only from
(Continued)

the surface in contact with the operation panel (300). Thus, leakage of light from around a figure indicating a touch key can be prevented, and the operation console comes to have a high-class look.

16 Claims, 22 Drawing Sheets

(56) References Cited

U.S. PATENT DOCUMENTS

| | | |
|---|---|---|
| 2010/0243417 A1 | 9/2010 | Watanabe |
| 2011/0199637 A1 | 8/2011 | Yoshida et al. |
| 2011/0199638 A1 | 8/2011 | Ogino et al. |
| 2011/0242612 A1 | 10/2011 | Tsubakimoto et al. |
| 2011/0317195 A1 | 12/2011 | Mitsui et al. |
| 2012/0242929 A1 | 9/2012 | Ohyama |

FOREIGN PATENT DOCUMENTS

| | | |
|---|---|---|
| JP | 10-109459 A | 4/1998 |
| JP | 2005-244360 A | 9/2005 |
| JP | 2006-154596 A | 6/2006 |
| JP | 2006-185700 A | 7/2006 |
| JP | 2006-293945 A | 10/2006 |
| JP | 2007-41507 A | 2/2007 |
| JP | 2008-129294 A | 6/2008 |
| JP | 2009-182765 A | 8/2009 |
| JP | 2010-086236 A | 4/2010 |
| JP | 2010-225480 A | 10/2010 |
| JP | 2011-170070 A | 9/2011 |
| JP | 2011-171960 A | 9/2011 |
| JP | 2011-217089 A | 10/2011 |
| JP | 2012-10172 A | 1/2012 |
| WO | 2011/070724 A1 | 6/2011 |

OTHER PUBLICATIONS

Nakamura et al., "Image Forming Apparatus", U.S. Appl. No. 15/648,744, filed Jul. 13, 2017.

OPERATION CONSOLE AND IMAGE PROCESSING APPARATUS WITH THE OPERATION CONSOLE

TECHNICAL FIELD

The present invention relates to an operation console for an image processing apparatus and, more specifically, to an operation console having a high-class looking and allowing a user to easily grasp roles (functions) of operation keys by illuminating characters, figures and the like displayed on operation keys from the backside with a light source such as an LED element.

BACKGROUND ART

As one type of image processing apparatuses as electronic equipment, an MFP (MultiFunction Peripheral) having a plurality of functions including copy function, printer function, scanner function and facsimile function has been known. Such an image processing apparatus requires many instructions and settings, and the settings are complicated. For this reason, a touch-panel display is often used for its operation console.

A touch-panel display is a device that detects a touch by a user, and it includes a display panel formed, for example, of a liquid crystal panel and a touch-panel placed on the display panel, for detecting a touched position. On the touch-panel display, software keys are displayed, and by touching the displayed keys, the user can enter instructions to the image processing apparatus. Even in such an image processing apparatus, however, for some functions (power on/off, power saving mode on/off, etc.), individual hardware keys are allocated and arranged on the operation console.

What is required of the operation console is not only having the function of entering instructions to the image processing apparatus. Since the user continuously looks at the operation console while he/she is operating the apparatus, the operation console may be regarded as the face of image processing apparatus. The impression of operation console decides the impression of the image processing apparatus as a whole. Therefore, to have the image processing apparatus considered to be a sophisticated, high-class apparatus, the operation console must have a high-class look.

As an example of an operation console using a touch-panel, Japanese Patent Laying-Open No. 2010-86236 (hereinafter referred to as '236 Reference) discloses a capacitance detection type touch-panel having protruding and recessed areas on its operation surface to prevent touching errors. On this touch-panel, recessed portions are formed at positions corresponding to various keys on the operation surface, to improve detection accuracy of key touching.

Sometimes, touch keys such as capacitance switches that can be operated by a light touch in the similar manner as the touch-panel are used as individual operation keys on the operation console. Such an operation key is structured, for example, as shown in FIG. 1. An operation key 900 has a key sheet 902 arranged on a housing (not shown) of an operation portion, and a circuit board 904 having LED elements 906 and 908 as light sources is arranged therebelow. Between key sheet 902 and circuit board 904, a transparent light guiding portion 910 that transmits light emitted from LED elements 906 and 908 is positioned.

Key sheet 902 is formed, for example, of polycarbonate with a colorant dispersed therein, having low transmissivity to visible light, and on its surface, figures representing various keys are printed at positions corresponding to respective keys. Specifically, the figure representing a key includes portions where ink is applied and other portions where ink is not applied. Light emitted from LED elements 906 and 908 passes through light guiding portion 910, enters key sheet 902 through an upper surface of light guiding portion 910, and emitted out from an upper surface of key sheet 902. In this manner, the figure printed on key sheet 902 is illuminated from the back side. Key sheet 902 has low light transmissivity at portions of the figure on which ink is not applied. If illuminated with light of a certain intensity or higher, however, it transmits light to some extent and, therefore, the figure is displayed in a manner visually recognizable easily, on key sheet 902.

SUMMARY OF INVENTION

Technical Problem

The touch-panel disclosed in '236 Reference, however, is not appropriate to provide a high-class look and to make the operation console more appealing as a product.

Further, in operation key 900 shown in FIG. 1, though the light emitted from LED elements 906 and 908 is guided to the upper surface of light guiding portion 910, the light also leaks from side surfaces of light guiding portion 910. Therefore, while the figure displayed on key sheet 902 is illuminated, portions surrounding the figure are slightly lit by the light leaked in a direction oblique to the surface of key sheet 902. As the light leaks from portions other than the portion through which emission of light is intended, the high-class look of operation keys is lost and the high-class look of the operation console itself is lost.

Even when a touch-panel display is used for the operation console, some of the keys are implemented as hardware keys, and it is possible that the user inadvertently operates these keys erroneously, without recognizing importance of the keys. For example, the user may easily press an important hardware key (such as the power on/off key).

Therefore, an object of the present invention is to provide an operation console using the method of illuminating figures representing operation keys from the back side, allowing easy recognition of operation keys by the user, preventing leakage of light from portions surrounding the figures representing operation keys and thereby providing a high-class look, as well as to provide an image processing apparatus provided with the operation console.

Further, an object of the present invention is to provide an operation console having a touch-panel display and a plurality of operation keys, reflecting operational sensations of these on a key arrangement and thereby facilitating easy understanding of key roles (functions) by the user, as well as to provide an image processing apparatus provided with the operation console.

Solution to Problem

According to a first aspect, the present invention provides an operation console including a touch-operation portion. The touch-operation portion is configured with a first touch-operation portion provided with a touch-panel type key, a second touch-operation portion provided with a capacitance type key, and a third touch-operation portion provided with a mechanical key. The first, second and third touch-operation portions are arranged in areas different from each other.

Preferably, the second and third touch-operation portions are arranged on upper and lower sides or on left and right sides of the first touch-operation portion, with the first touch-operation portion being a reference.

More preferably, the first and third touch-operation portions are arranged on left and right sides of the second touch-operation portion, with the second touch-operation portion positioned in-between.

More preferably, the second touch-operation portion is positioned on upper and right sides of the first touch-operation portion with the first touch-operation portion positioned in-between, and the third touch-operation portion is positioned on a lower side of the first touch-operation portion.

In this manner, on the operation console, keys having different touch sensations are arranged in different areas in accordance with the touch sensations and, therefore, the user does not feel any strangeness when he/she operates the keys.

Preferably, the operation console further includes a partition separating areas, in which the first, second and third touch-operation portions are respectively arranged, from each other.

More preferably, the partition is a frame surrounding at least one of the first, second and third touch-operation portions.

More preferably, the partition is each of areas of different colors in which the first, second and third touch-operation portions are arranged, respectively.

Preferably, the partition is a partition line arranged between neighboring areas among the areas in which the first, second and third touch-operation portions are respectively arranged.

Since a partition or partitions are provided in this manner, areas having different types of keys arranged can be clearly distinguished from each other and, therefore, the user does not feel any strangeness when he/she operates the keys.

More preferably, the operation console further includes: a first operation portion on which the first and second touch-operation portions are arranged; and a second operation portion on which the third touch-operation portion is arranged. The first operation portion is rotatable such that an upper surface of an operation panel is arranged tilted with respect to an upper surface of the second operation portion.

In this manner, since the touch-panel type keys and capacitance type keys having similar operational sensations are arranged on the tiltable first operation portion and the mechanical keys are arranged on the fixed, untiltable second operation portion, it is possible for the user to understand the roles of respective keys easily when mechanical keys are used for relatively important keys such as the power key and, therefore, erroneous operation of an important key can be prevented.

More preferably, the first and second touch-operation portions and the third touch-operation portion are separated by rotation of the first operation portion.

In this manner, areas having different types of keys arranged can be clearly distinguished from each other and, therefore, the user does not feel any strangeness when he/she operates the keys.

According to a second aspect, the present invention provides an operation console, including a touch-operation portion. The touch-operation portion includes: a circuit board mounting a light source emitting visible light; a light transmitting portion transmitting the visible light emitted from the light source; a light shielding portion not transmitting the visible light emitted from the light source; and an operation panel in contact with an upper surface of the light transmitting portion. The circuit board and the light shielding portion accommodate the light source, and the light shielding portion covers the light transmitting portion such that the light emitted from the light source is emitted through the upper surface of the light transmitting portion.

In this manner, the light emitted from the light source does not leak from the side surfaces and it can efficiently be emitted from the upper surface of the light transmitting portion. Therefore, different from a conventional example in which portions surrounding the operation key are dimly lit by the leaked light, the operation console comes to have a high-class look.

Preferably, the operation panel is semi-transparent.

This further improves the high-class look of the operation console.

More preferably, at least one of a prescribed figure, character and sign is formed by printing on the upper surface of the light transmitting portion.

In this manner, figures or the like related to the functions of the touch operation portion are formed on the upper surface of the light transmitting portion, so that it becomes possible to display the figures or the like as if they are raised on the operation panel. This further improves the high-class look of the operation console.

More preferably, the operation panel has a recessed portion at a position opposite to a portion in contact with the upper surface of the light transmitting portion; the recessed portion is formed of a plurality of curved surfaces having different curvatures; and of the plurality of curved surfaces forming the recessed portion, the curvature radius of the curved surface positioned at the center is larger than the curvature radius of a curved surface positioned at a periphery.

In this manner, a recessed portion is formed at a position in contact with the light emitting portion of the operation panel and, therefore, touching by the user becomes easier. Further, since the recess is formed by a plurality of curved surfaces with different curvatures, the border between the curved surfaces appears as a circular edge. This improves visibility to the user. Further, of the plurality of curved surfaces forming the recessed portion, one positioned at the center is adapted to have a nearly planar shape. Therefore, the figure or the like that come to be displayed by the back light is not distorted. This further improves the high-class look of the operation console.

Preferably, the light transmitting portion and the light shielding portion are arranged below an operation area of the operation panel.

Thus, the operation console comes to have a high-class look.

More preferably, the circuit board covers a back surface of the light transmitting portion; and the light shielding portion covers surfaces other than the upper surface and the back surface of the light transmitting portion.

This prevents leakage of light that leads to lower quality of the operation console.

More preferably, the light source is arranged in a recessed portion formed at a periphery of the light transmitting portion; and the recessed portion is formed at a position preventing direct emission without reflection of the light emitted from the light source through the upper surface of the light transmitting portion.

Therefore, the light emitted from the light source is diffused and emitted as light having uniform brightness from the upper surface of the light transmitting portion. Therefore, the displayed figure is not partially made bright, and good figure of uniform brightness can be presented to the user.

Preferably, the light transmitting portion and the light shielding portion are formed integrally by two-color molding of resin using a mold.

In this manner, since the light transmitting portion and the light shielding portion are formed by two-color molding, the joining portion between these can easily be tight-bonded and leakage of light can be prevented.

According to a third aspect, the present invention provides an image processing apparatus including the above-described operation consol and an image processing unit performing an image processing operation on an image, and in response to an instruction of image processing entered from the operation console, the image processing unit is caused to execute the instructed image processing.

In this manner, with the operation console in accordance with the present invention, the user does not feel any strangeness when he/she operates keys of different tactile sensations, and the image processing apparatus as a whole comes to have a high-class look.

Advantageous Effects of Invention

According to the present invention, when the user operates keys of different types of different tactile sensations, he/she does not feel any strangeness, and he/she can easily understand the key roles (functions).

Further, the light emitted from the light source doe not leak from the side surfaces, and it can efficiently be emitted from the upper surface of light transmitting portion. Therefore, different from a conventional example in which portions surrounding the operation key are dimly lit by the leaked light, the operation console comes to have a high-class look.

DESCRIPTION OF EMBODIMENTS

Figure 1:
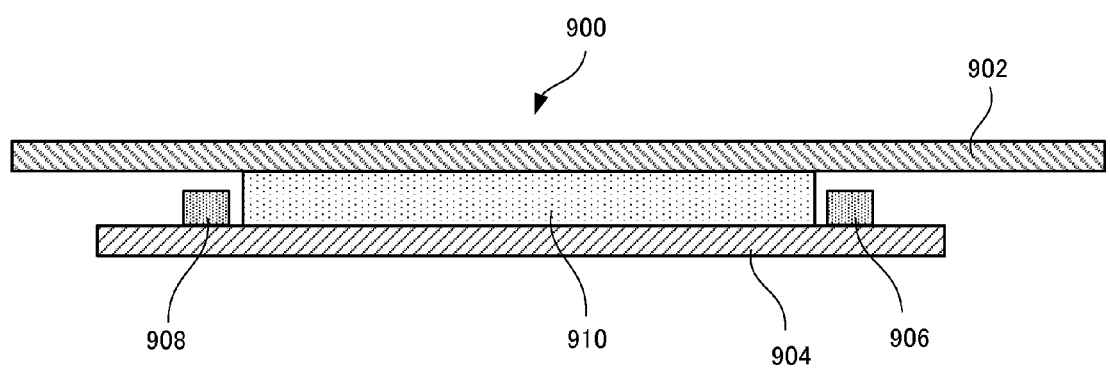
FIG. 1 is a cross-sectional view showing a structure of a conventional hardware key having LED elements.

In the following embodiments, the same components are denoted by the same reference characters. Their names and functions are also the same. Therefore, detailed description thereof will not be repeated.

First Embodiment

Figure 2:
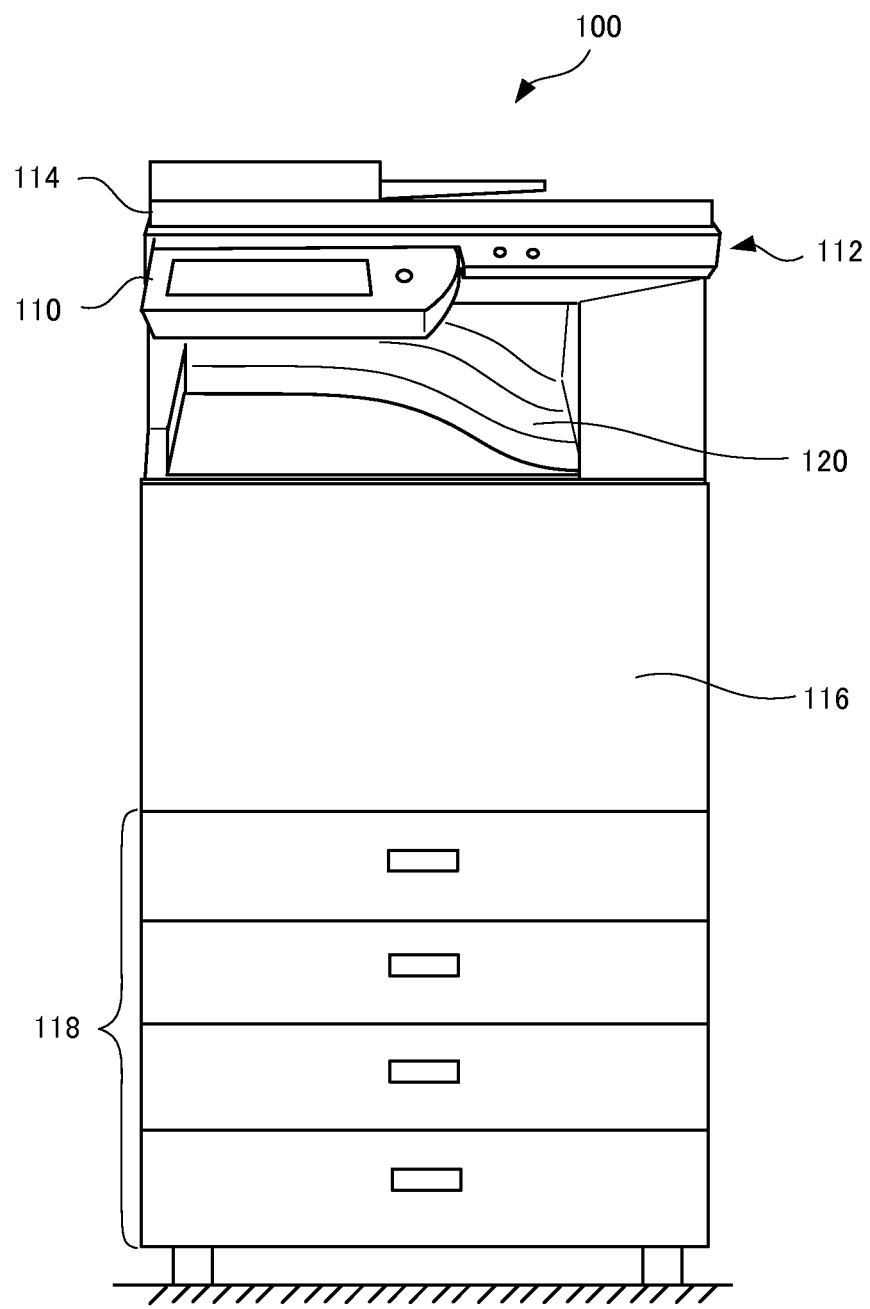
FIG. 2 is a front view showing an appearance of the image processing apparatus provided with the operation console in accordance with the first embodiment of the present invention.

An image processing apparatus provided with the operation console in accordance with the first embodiment of the present invention includes copy function, printer function, scanner function and facsimile function. Referring to FIG. 2, image processing apparatus 100 includes an operation console 110 for entering instructions to image processing apparatus 100, an image reading unit 112, an automatic document feeder (ADF) 114 positioned above image reading unit 112, an image processing unit 116 positioned below image reading unit 112, a paper feed unit 118 and paper discharge tray 120.

In addition to the components mentioned above, image processing apparatus 100 includes a modem for connection to a telephone line, and an NIC (Network Interface Card) for connection to a communication line. Further, image processing apparatus 100 includes a CPU for controlling various units, an ROM storing programs to be executed by the CPU to realize prescribed functions, an RAM and the like.

On operation console 110 in accordance with the present embodiment, various operation keys and a touch-panel display are arranged. An instruction to image processing apparatus 100 is entered by the operation of operation console 110 by the user. For example, assume that a document is to be copied. When the user sets the document on ADF 114, sets copy conditions and touches a start key (software key) displayed on touch-panel display, image processing apparatus 100 starts copying of the document. ADF 114 feeds the document to a reading position on a platen glass (not shown), image reading unit 112 reads the surface of the document and image data is generated. Image processing unit 116 executes a prescribed image processing operation on the generated image data, and forms an image by toner on a sheet of recording paper fed from paper feed unit 118. Thereafter, the sheet of recording paper having the image thus formed is discharged to paper discharge tray 120.

Figure 3:
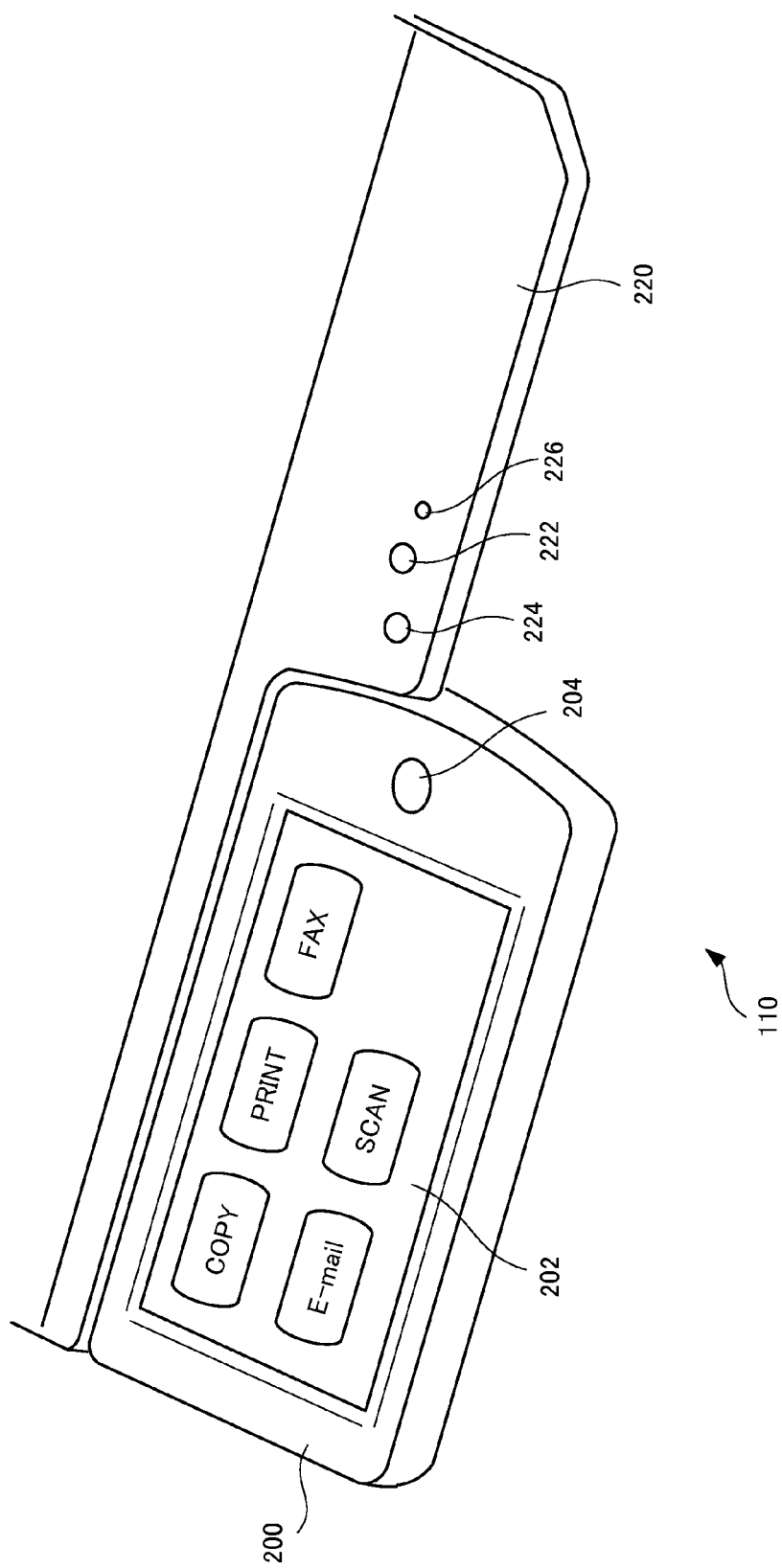
FIG. 3 is a perspective view showing the operation console in accordance with the first embodiment of the present invention.

Referring to FIG. 3, operation console 110 consists of a first operation portion 200 and a second operation portion 220. The first operation portion 200 has a touch-panel display 202 and a home key 204. Touch-panel display 202 includes a display panel formed, for example, of a liquid crystal panel, and a touch-panel positioned on the display panel, for detecting a touched position. In FIG. 3, a basic screen image of image processing apparatus 100 is displayed on touch-panel display 202 (display panel). On the basic screen image, keys (software keys) for displaying screen images for settings related to the copy, print, and scanner functions, respectively, are displayed.

Home key 204 is a hardware key. The screen image displayed on touch-panel display 202 changes variously (screen images make transitions) in accordance with the state of image processing apparatus 100. Home key 204 is to return the display on touch-panel display 202 to the basic screen image. Specifically, when home key 204 is pressed, the basic screen image appears on touch-panel display 202.

The second operation portion 220 includes a power key 222 and an energy saving key 224, which are hardware keys, and an LED lamp 226. Power key 222 is for turning on/off the power to image processing apparatus 100. Energy saving key 224 is to cause transition of image processing apparatus 100 to a power saving state or from the power saving state to a normal state. LED lamp 226 is lit when image processing apparatus 100 is on.

Figure 4:
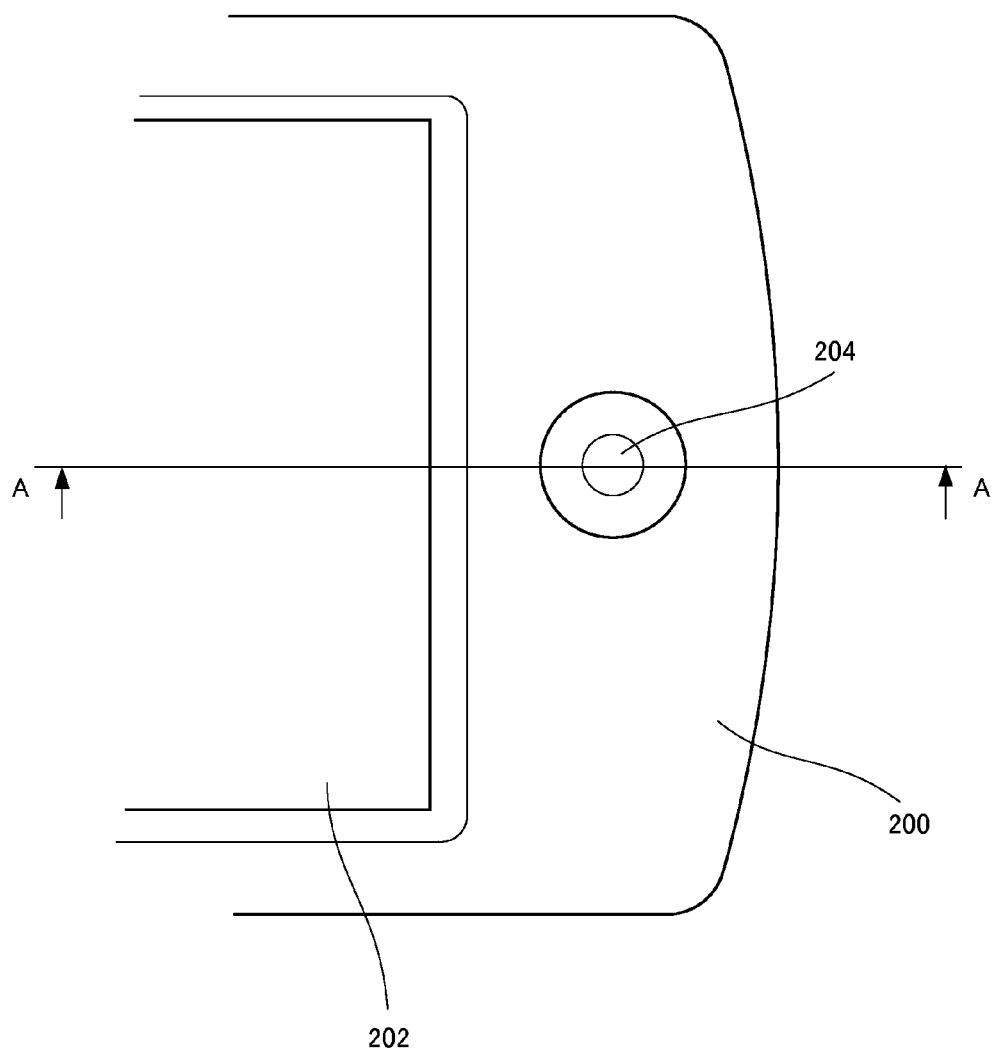
FIG. 4 is a plan view showing a part of the operation console shown in FIG. 2.

The present embodiment is characterized by the structure of home key 204. FIG. 4 shows a line AA passing near the center of home key 204, along the longitudinal direction of operation console 200. In the following, the structure of home key 204 will be described in detail with reference to FIG. 5 showing a cross-section along the line AA.

Figure 5:
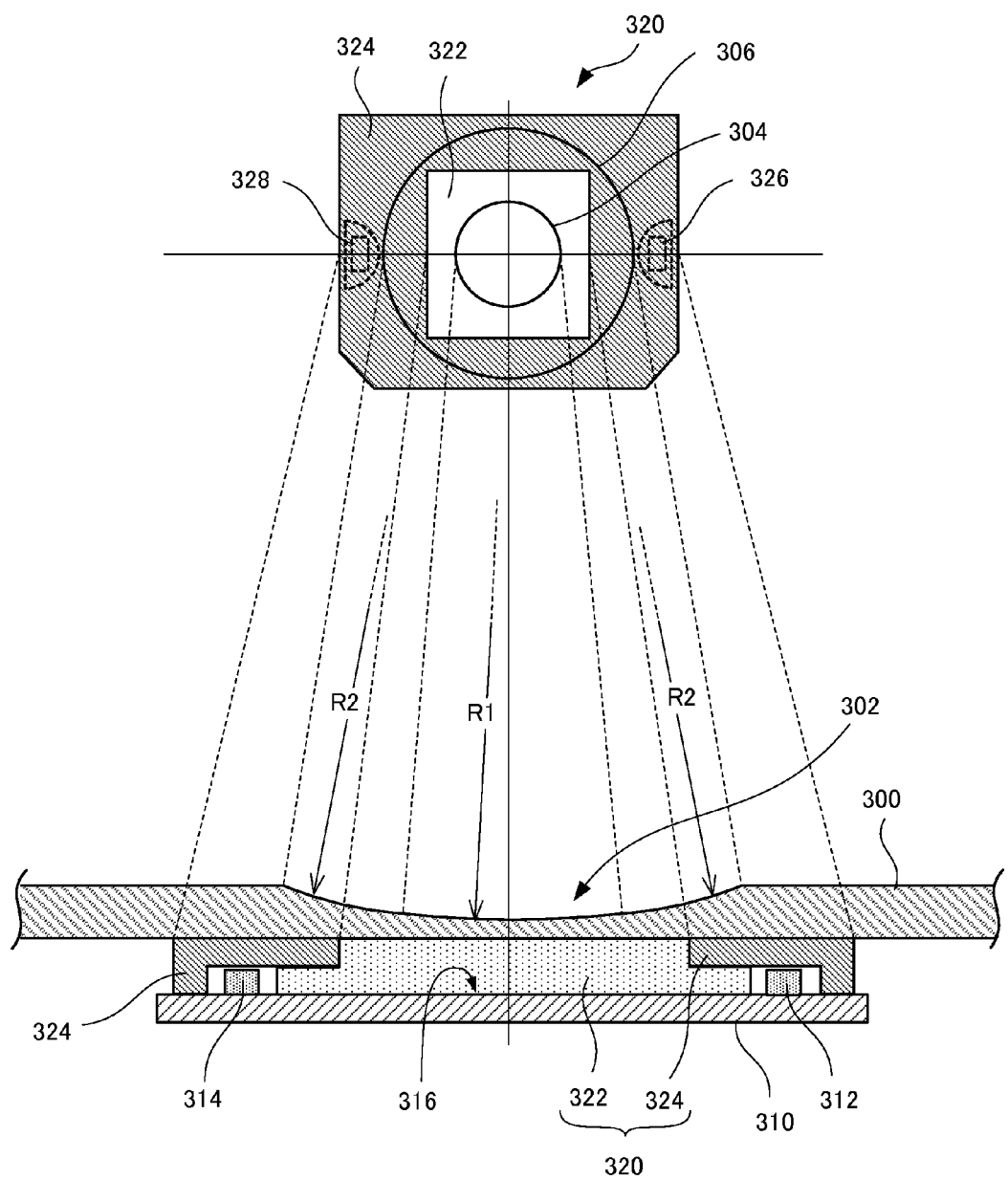
FIG. 5 is a partial sectional view taken along the line AA of FIG. 4.
Figure 6:
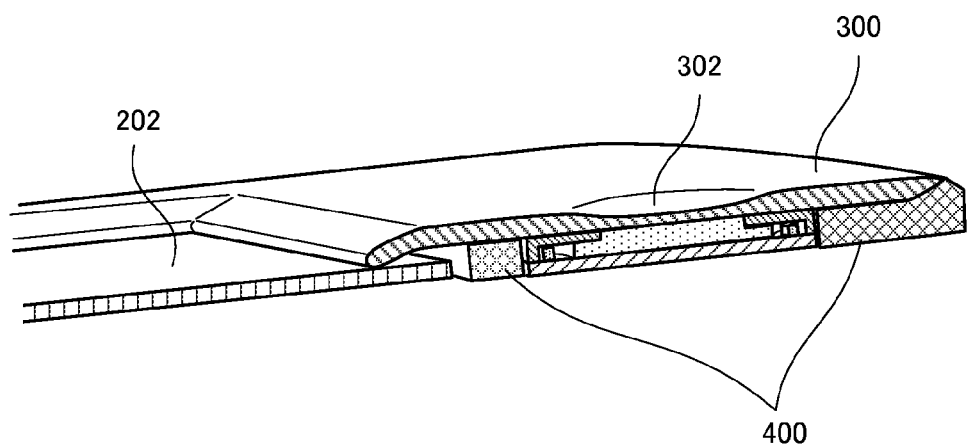
FIG. 6 is a perspective view showing a partial cross-section taken along the line AA of FIG. 4.

Referring to the cross-section on the lower part of FIG. 5, home key 204 includes a circuit board 310 having LED elements 312 and 314 mounted thereon, and a light guiding portion 320 for guiding light emitted from LED elements 312 and 314 in a prescribed direction. These are arranged below an operation panel (hereinafter simply referred to as a panel) forming a surface of first operation portion 200, and supported and fixed by a frame 400 (see FIG. 6). That portion of panel 300 which is positioned above light guiding portion 320 is also an element forming home key 204.

Panel 300 is formed of a semi-transparent member having low transmissivity to visible light. By way of example, panel 300 is formed of colorant-dissipated polycarbonate of smoky dark color (such as black or brown), to attain high-class look. Panel 300 has light transmissivity to some extent only to light of prescribed brightness or higher. Therefore, when assembled as operation console 110, the inside of operation console 110 is not visible to the user through panel 300.

Figure 7:
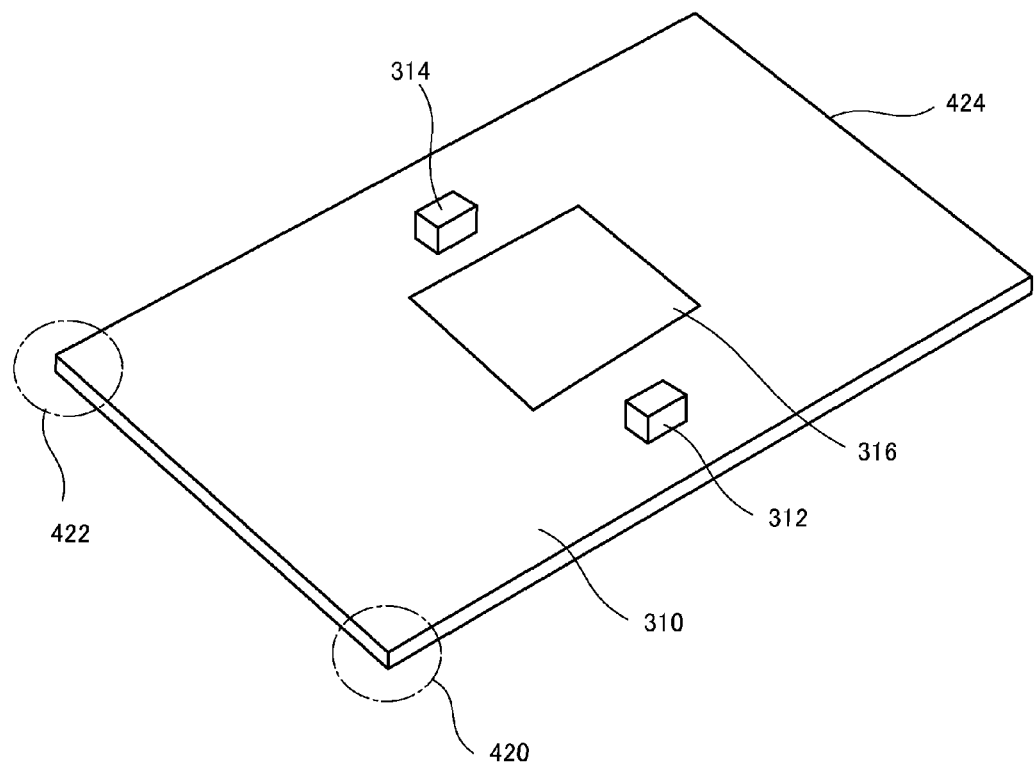
FIG. 7 is a perspective view of a circuit board.

Referring to FIG. 7, circuit board 310 has LED elements 312 and 314. Further, circuit board 310 has electric lines for feeding electric power from a power source to LED elements 312 and 314, and a capacitance switch. The capacitance switch is a known switch including electrodes and a detecting circuit for detecting a change in electrostatic capacitance between the electrodes. LED elements 312 and 314 emit, for example, white visible light. Electrodes of capacitance switch are arranged on an electrode arranging area 316. Circuit board 310 is formed of non-light-transmitting member that does not pass the light emitted from LED elements 312 and 314 (for example, epoxy resin containing glass fiber). Electrode arranging area 316 is coated white.

Light guiding portion 320 includes a light transmitting portion 322 and a light shielding portion 324. Light transmitting portion 322 is formed of a transparent member to pass the visible light emitted from LED elements 312 and 314. Light transmitting portion 322 is formed, for example, of polycarbonate. Light shielding portion 324 is of a non-light-transmitting member that does not pass the visible light emitted from LED elements 312 and 314, and it is formed in tight contact with light transmitting portion 322 to cover the peripheral portion except for the central portion of the upper surface (the surface on the side of panel 300) of light transmitting portion 322 and over the entire side surfaces. Light shielding portion 324 is formed, for example, of polycarbonate having black colorant dispersed therein.

Figure 8:
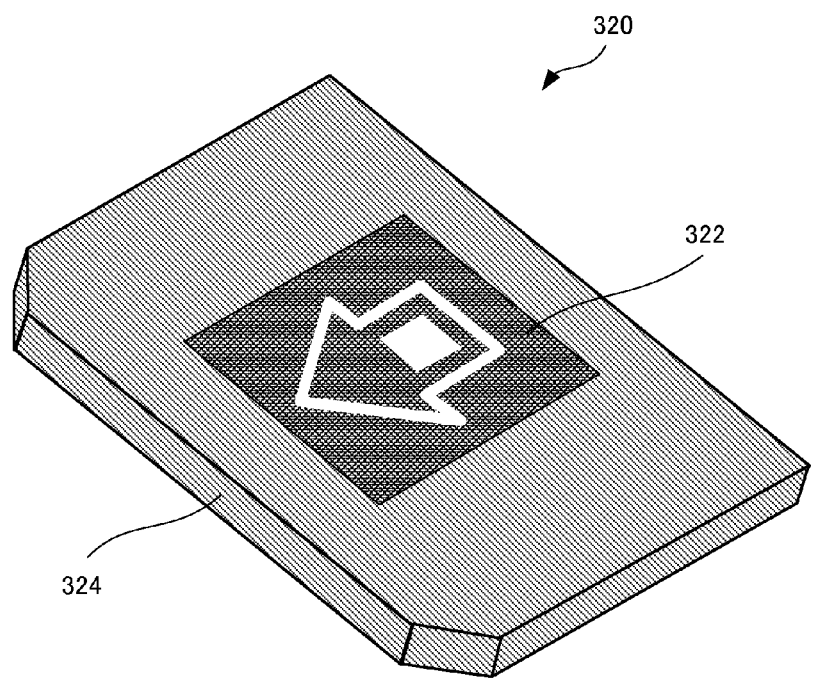
FIG. 8 is a perspective view showing a front side surface of light guiding portion.
Figure 9:
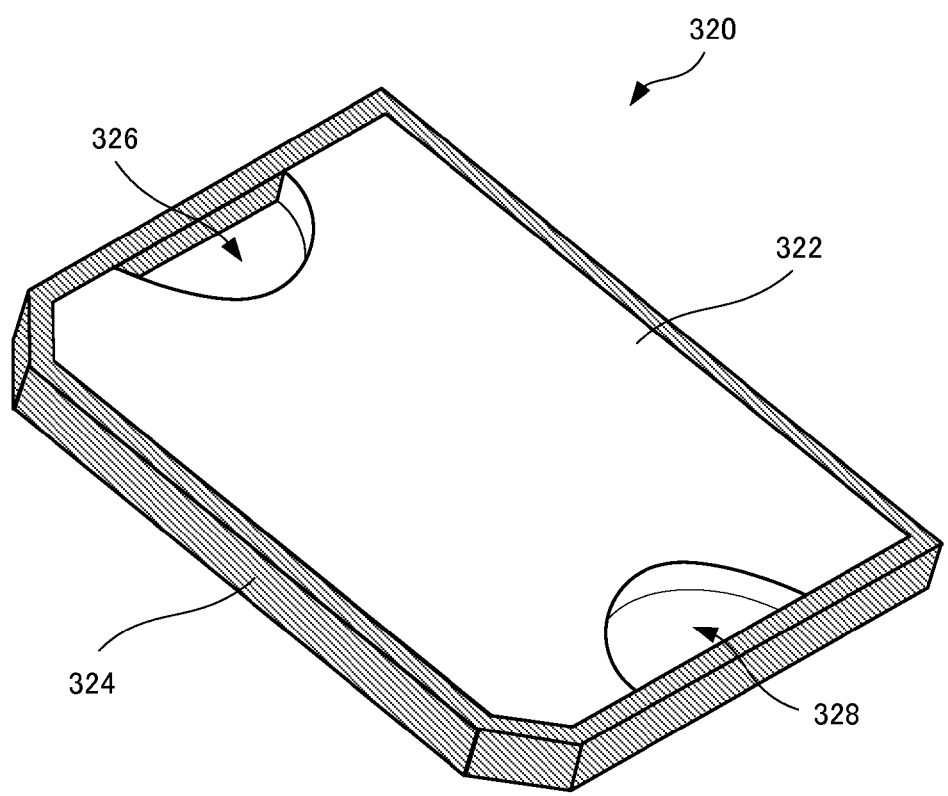
FIG. 9 is a perspective view showing a back side surface of light guiding portion.
Figure 10:
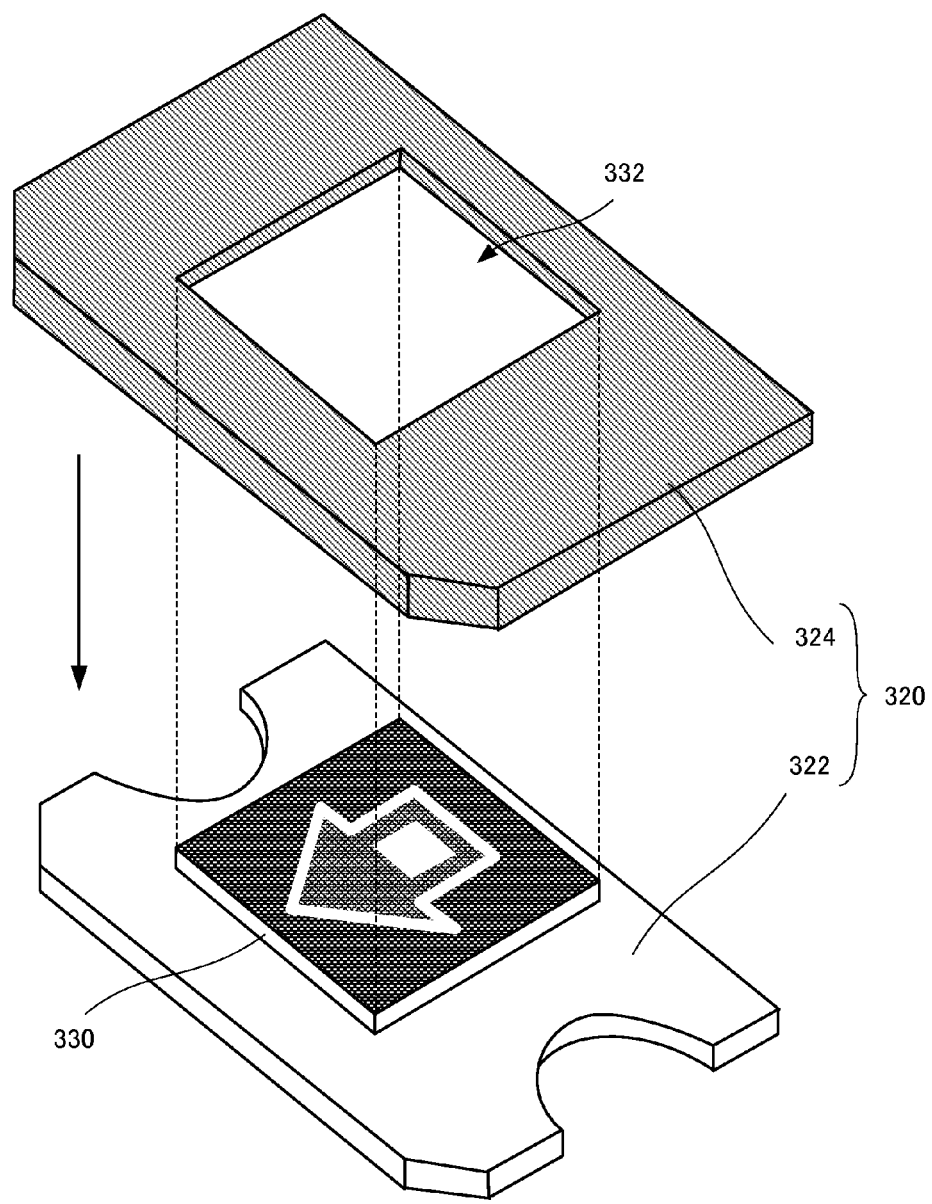
FIG. 10 is a perspective view of the light guiding portion showing the light transmitting portion and the light shielding portion separately.

FIGS. 8 and 9 show examples of light transmitting portion 322 and light shielding portion 324. In FIG. 8, on the upper surface of light transmitting portion 322 not covered by light shielding portion 324 (the portion in contact with the back surface of panel 300), a figure of a house is printed to indicate that is it a home key. Hatched portion is printed black, while unhatched portion is not printed but left transparent. As shown in FIG. 9, on the back surface of light transmitting portion 322, recessed portions (LED element receiving portions 326 and 328) are formed to accommodate LED elements 312 and 314. When separated, light transmitting portion 322 and light shielding portion 324 are as shown in FIG. 10. FIGS. 8 and 9 show the protruding portion 330 of light transmitting portion 322 fit (in tight contact) to an opening 332 of light shielding portion 324.

Light transmitting portion 322 and light shielding portion 324 are preferably formed by a known two-color molding (double molding) using a mold (such as a metal mold) for resin molding. It is possible to form light transmitting portion 322 and light shielding portion 324 separately and then to fit and integrate the two portions. In order to attain tight contact leaving no space to prevent leakage of light, very elaborate manufacturing technique is required. It is not easy to form an integral body by fitting. It may be possible to form light shielding portion 324 by printing (for example, by serigraph) on the surface of light transmitting portion 322. It is necessary, however, to print not only on the upper surface but also on side surfaces of light transmitting portion 322. Therefore, the printing work is complicated and costly. By forming light transmitting portion 322 and light shielding portion 324 by two-color molding, light transmitting portion 322 and light shielding portion 324 are in tight contact and, therefore, leakage of light at the joining portion between light transmitting portion 322 and light shielding portion 324 can be prevented.

Since light guiding portion 320 is formed in this manner, the light emitted from LED elements 312 and 314 positioned in LED element receiving portions 326 and 328 of light transmitting portion 322 enters through the curved surfaces of LED element receiving portions 326 and 328 to light transmitting portion 322. As described later, on the back surface of light transmitting portion 322 (the side facing circuit board 310), circuit board 310 is mounted in tight contact and, hence, the back surface is fully covered by circuit board 310. Electrode arranging area 316 of circuit board 310 is in contact with light transmitting portion 322. In this manner, light transmitting portion 322 has its side surfaces and the peripheral portion of the upper surface covered by light shielding portion 324, and has its back surface in tight contact with light non-transmitting circuit board 310. Therefore, the entered light is emitted only through the central portion of the upper surface of light transmitting portion 322.

Since LED elements 312 and 314 are arranged at portions covered by light shielding portion 324 on a peripheral portion away from the center of light transmitting portion 322, the light emitted from LED elements 312 and 314 is not directly emitted through the upper surface (the portion not covered by light shielding portion 324) of light transmitting portion 322. The light emitted from LED elements 312 and 314 is repeatedly reflected by light shielding portion 324 and the surface of circuit board 310 while passing through light transmitting portion 322 and therefore, the light is diffused. Thus, the light emitted from LED elements 312 and 314 can be emitted uniformly from the upper surface of light transmitting portion 322, with the light intensity not having locally high distribution. That the electrode arranging area 316 of circuit board 310 is coated white as described above is also effective to have the light from LED elements 312 and 314 emitted uniformly from the upper surface of light transmitting portion 322. Further, it is preferable to have the back surface of light transmitting portion 322 finished like frosted glass.

At that portion on the surface of panel 300 which corresponds to the upper surface (the portion not covered by light shielding portion 324) of light transmitting portion 322, a recessed portion 302 is formed. As described above, panel 300 is formed of polycarbonate of dark, smoky color and has low light transmissivity. Therefore, here, the thickness of panel 300 is reduced to let the light from LED elements 312 and 314 emitted and to allow recessed portion 302 to be visibly recognized as home key 204 by the user.

Specifically, the recessed portion 302 of panel 300 is formed as a curved surface (partial sphere) having a prescribed curvature radius R1 at the center and a curved surface (partial sphere) of curvature radius R2 smaller than R1. Specifically, the central portion of recessed portion 302 is formed less curved than the peripheral portion (the area having curvature radius R2). The center of the curved surface of central portion and the center of the curved surface of peripheral portion are preferably on the normal at the center of recessed portion 302. Thus, on panel 300, two concentric edges are formed. FIG. 5 shows, on the upper half, a plan view of light guiding portion 320, in which a border between the area of curvature radius R1 and the area of curvature radius R2 is represented by a circle 304. A circle 306 represents an outer periphery of the area of curvature radius R2 (the edge between the area of curvature radius R2 and the flat portion). In FIG. 5, the corresponding portions between the plan view on the upper half and the cross section on the lower half are connected by dotted lines.

Thus, the light emitted from the upper surface of light transmitting portion 322 and entered panel 300 from the back surface comes out from the surface of panel 300. Specifically, the user can visually recognize the figure (including a character, a figure or the like) formed (printed) on the upper surface of light transmitting portion 322. Here, because of light shielding portion 324, the light is emitted only through the upper surface of light transmitting portion 322 and, different from the conventional example (see FIG. 1), the light does not leak in the lateral direction of light guiding portion 320 and does not dimly illuminate the surroundings of the figure. This presents a high-class look to the user.

Since recessed portion 302 is formed of two surfaces of different curvatures, visibly recognizable two circular edges are formed at the boundary of these areas as described above. Therefore, the user can easily understand that home key 204 is a touchable switch, the circle 306 represents an operable area and that the inner circle 304 represents an area in which the touch detection sensitivity is high.

Figure 11:
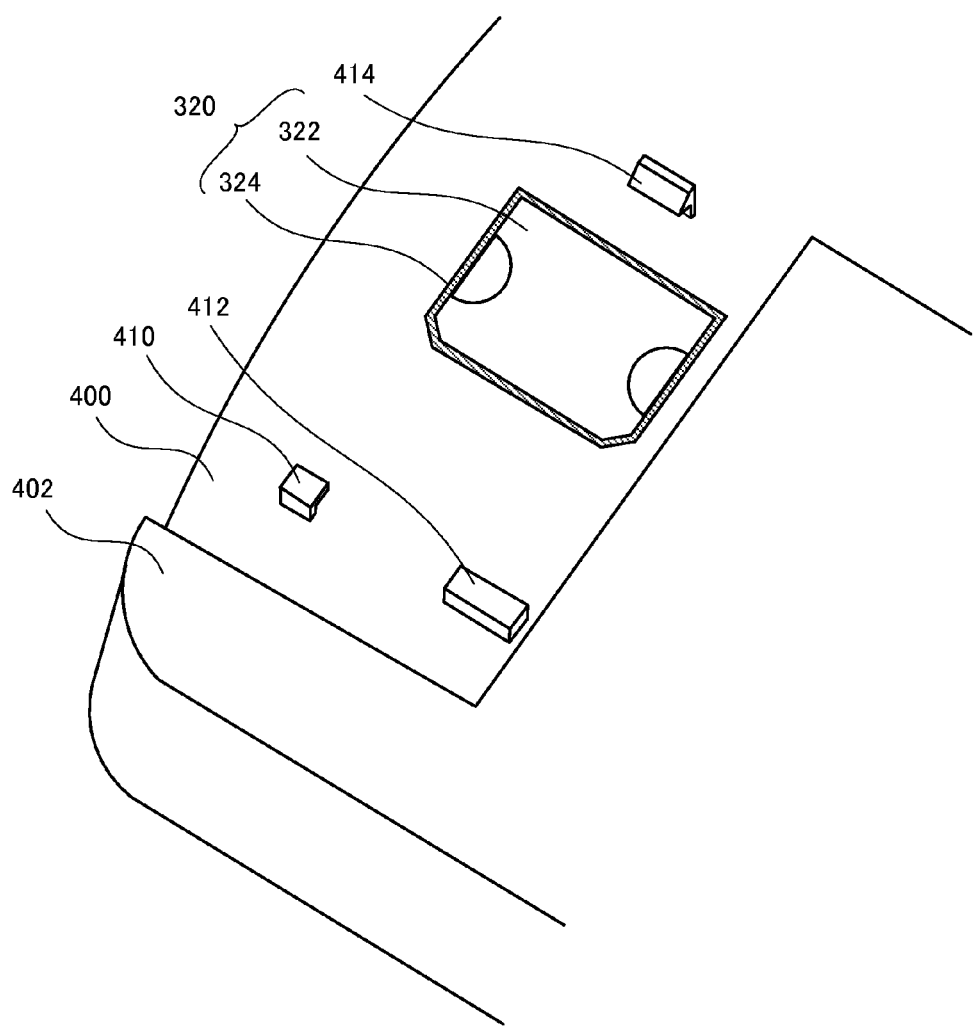
FIG. 11 is a perspective view showing the back surface of operation console on which the light transmitting portion and the light shielding portion are mounted.
Figure 12:
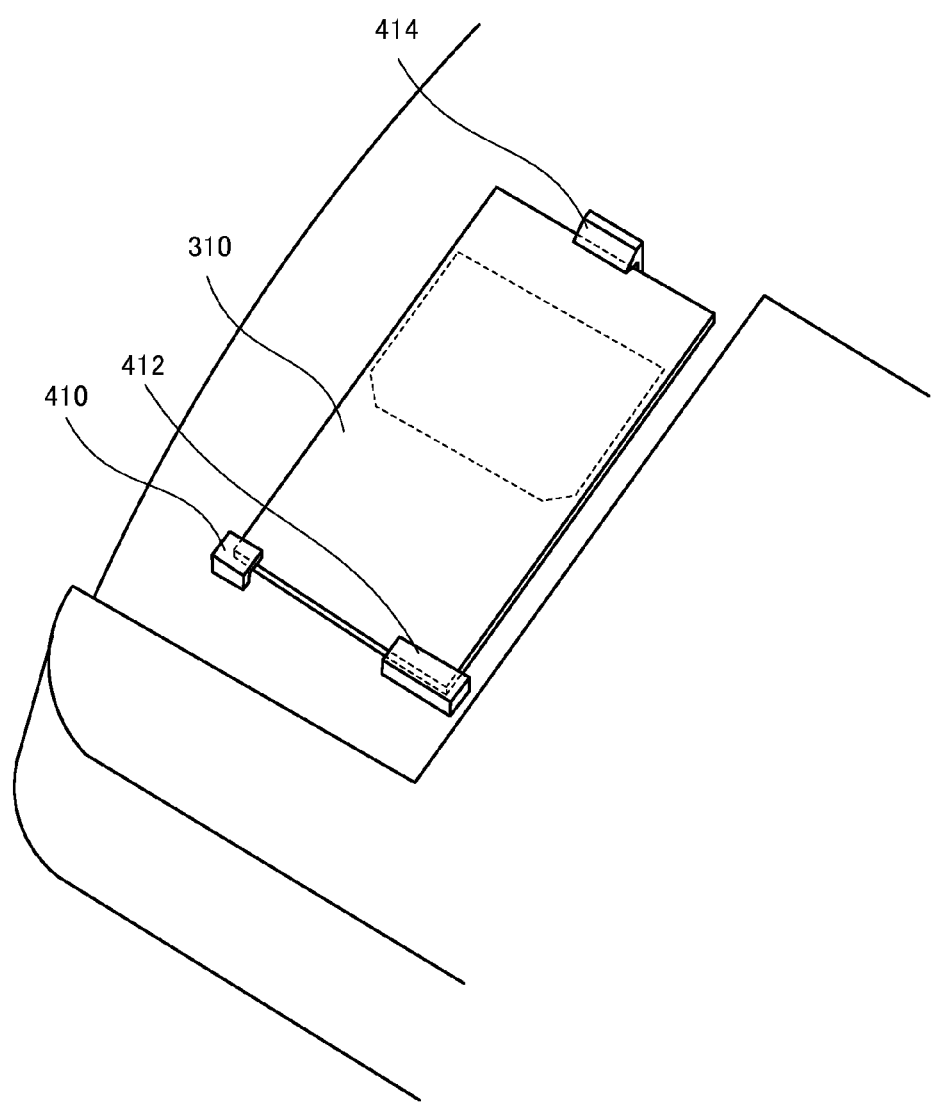
FIG. 12 is a perspective view showing the back surface of operation console on which the circuit board is mounted.

Referring to FIGS. 11 and 12, mounting of light guiding portion 320 and circuit board 310 to the first operation portion 200 will be described. Light guiding portion 320 is inserted to an opening formed in a frame 400 arranged at a position slightly lower (a position closer to the surface of operation console 110) than the back surface 402 of first operation portion 200 (see FIG. 6). FIG. 11 shows the back surface of light guiding portion 320, that is, the rear surfaces of light transmitting portion 322 and light shielding portion 324. The thicknesses of light guiding portion 320 and frame 400 are designed such that the back surface of light guiding portion 320 and the surface of frame 400 are substantially at the same level and no step is formed therebetween.

In the state shown in FIG. 11, circuit board 310 is mounted. On frame 400, supporting portions 410 and 412 having L-shaped cross sections and a fixing portion 414 with a hook are formed. Supporting portions 410 and 412 can accommodate two corners of circuit board 310 with substantially no space to frame 400. Referring to FIGS. 12 and 7, a corner 420 of circuit board 310 is inserted to supporting portion 410, a corner 422 is inserted to supporting portion 412 and, in this state, a side 424 opposite to these two corners of circuit board 310 is pushed by external force to frame 400, so that the side 424 of circuit board 310 is fixed by the hook of fixing portion 414. In this manner, that surface of circuit board 310 on which LED elements 312 and 314 are formed can be brought to tight contact with the back surface of frame 400 and light transmitting portion 322 (electrode arranging area 316 of circuit board 310 comes to be in tight contact with light transmitting portion 322). Therefore, the light emitted from LED elements 312 and 314 does not leak to the outside from the back surface of light transmitting portion 322.

With operation console 110 structured as described above, it is possible to irradiate the figure represented by home key 204 efficiently and uniformly from the back side, and irradiation of surrounding portions of the figure by the laterally leaked light can be prevented. This leads to a high-class look of operation console 110.

Though an example in which the figure is printed only on the upper surface of light transmitting portion 322 is shown in FIG. 8, printing may be done on the entire upper surface of light guiding portion 320 including the upper surface of light shielding portion 324. The figure to be printed is not limited to a figure of a house. Any figure, character or sign in accordance with the key function may be used.

The number of LED elements is not limited to two. One, or three or more LED elements may be arranged on the circuit board. In that case also, the recessed portion or portions for accommodating the LED elements should preferably be formed at the peripheral portion of light transmitting portion 322.

The light source is not limited to LED elements 312 and 314. Any light source that can emit visible light and irradiate the figure representing home key 204 from the back side may be used. The shape and color of LED elements 312 and 314 are not limited to the above. By way of example, a dome shaped LED element may be used. An LED element emitting visible light of red, blue, etc. may be used.

The shape of recessed portion formed on light transmitting portion 322 to accommodate the LED element is not limited to the shape shown in FIG. 9. It may have any shape by combining a plurality of curved and flat surfaces.

Though a capacitance switch is used as the home key in the example above, it is not limiting. Any type of switch may be used provided that the shape of the switch does not much change when it is pressed and that the on/off can be detected simply by a light touch.

Further, the shape of light guiding portion 320 is not limited to the shape with six corners formed by cutting out corners of a rectangle when viewed two dimensionally as shown in FIG. 8, and it may have any shape. The corners are cut out in the example of FIG. 8 in order to uniquely determine the direction of mounting light guiding portion 320 on frame 400.

If the shape printed on the upper surface of light transmitting portion 322 is large and it is printed on the entire upper surface of light transmitting portion 322, light shielding portion 324 may not be formed to have an L-shaped cross section as shown in FIG. 5. Specifically, it may be formed to cover only the side surface of light transmitting portion 322 and not the upper surface of light transmitting portion 322. In that case, the light transmitting portion does not have such a shape as shown in FIG. 10 with a protruding portion 330 but it has a flat shape of uniform thickness, and the light shielding portion has such a shape that covers only the side surfaces of light transmitting portion.

Second Embodiment

The operation console in accordance with a second embodiment will be described. The operation console in accordance with the second embodiment is structured in the similar manner as the operation console in accordance with the first embodiment, and mounted on image processing apparatus 100 as shown in FIGS. 2 and 3. The second embodiment differs from the first embodiment in the key arrangement on the operation console.

The operation console in accordance with the present embodiment includes a first operation portion 200 and a second operation portion 220. As described with reference to FIG. 3 in the first embodiment, on the first operation portion 200, touch-panel display 202 and home key 204 are arranged, and on the second operation portion 220, power key 222 and energy saving key 224 are arranged.

Touch-panel display 202 is a device for detecting a touched position. As the method of detecting a touched position, capacitance method, infrared interruption detecting method, surface acoustic wave method, resistive film method and the like have been known. By such a method, the user can operate the apparatus by simply touching lightly or just bringing his/her finger close to the surface of touch-panel display 202.

Home key 204 is, for example, a capacitance switch as described above, and by detecting a change in electrostatic capacitance, touching by a finger or the like (user operation) can be detected. As in the case of touch-panel display, the user has only to touch lightly the home key 204 with his/her finger or the like. Therefore, touch-panel display 202 and home key 204 have similar operational sensations or feelings.

On the other hand, power key 222 and energy saving key 224 are keys in which contact points come into physical contact (hereinafter referred to as mechanical keys). By way of example, a tactile switch known by the trade name of TACT Switch (registered trademark) or the like is used. These keys have important functions and, therefore have high reliability. It is necessary that these keys are operated by the user with clear intention. Generally, for these keys, mechanical keys are used and touch keys, which can be operated by simple, light touch such as capacitance switches, are not used. Such a mechanical key has its shape changed in a clearly recognizable manner when it is pressed. Specifically, the user is aware of the pressing operation. Therefore, the operational sensation of power key 222 and energy saving key 224 is much different from that of touch-panel display 202 and home key 204.

Figure 13:
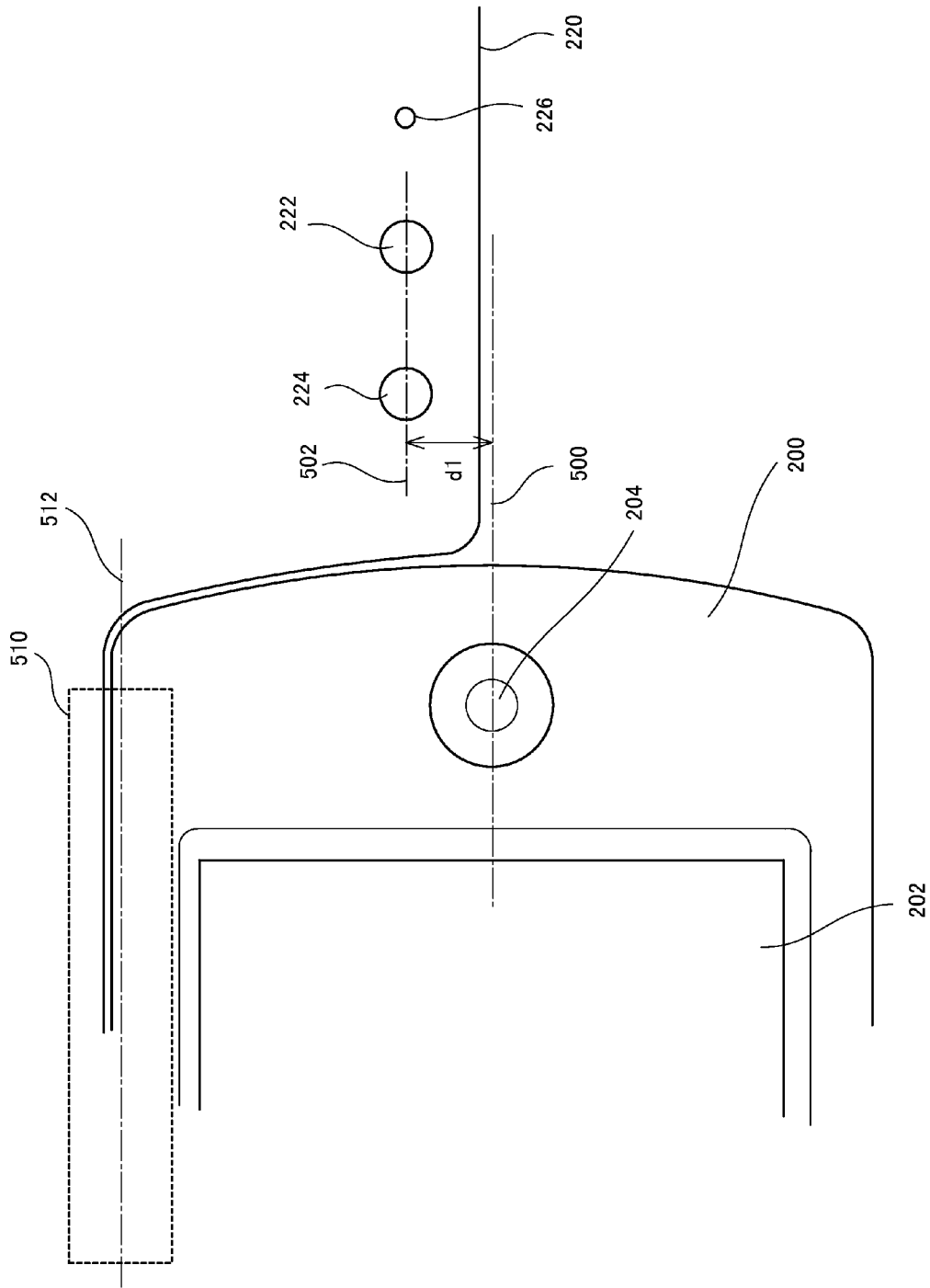
FIG. 13 is a plan view showing an arrangement of operation keys on the operation console in accordance with a second embodiment of the present invention.

Referring to FIG. 13, operation console 110 has a tilting mechanism 510 at the boundary portion between the first operation portion 200 and the second operation portion 220 (lower side or inside of first and second operation portions 200 and 220). Tilting mechanism 510 is to rotate the first operation portion 200 around a rotation axis 512 by a prescribed angle. Specifically, the upper surface of first operation portion 200 can be arranged (tilted) to form a prescribed angle with respect to the upper surface of the second operation portion 220. Any known mechanism may be used for tilting mechanism 510 and, therefore, it is simply schematically represented by a dotted line. The position where tilting mechanism is to be provided is not limited to the position shown in FIG. 13, and it may be arranged appropriately in accordance with the adopted tilting mechanism.

The tilting function of first operation portion 200 is useful when touch-panel display 202 is operated. The user operates touch-panel display 202 for a relatively long time for setting image processing apparatus 100. Therefore, it is preferred that touch-panel display 202 can be tilted to fit the height of the user. From this viewpoint, the first operation portion 200 having touch-panel display 202 arranged thereon is provided with the tilting mechanism.

Three operation keys arranged on operation console 110 (that is, home key 204, power key 222 and energy saving key 224) are arranged at the center of operation console 110, and keys having similar operational sensations are arranged close to each other on opposite sides of the boundary between the portions to be tilted or not tilted.

Specifically, home key 204 is arranged on first operation portion 200 that is tiltable and on which touch-panel display 202 is arranged. Power key 222 and energy saving key 224 of which operational sensation is different from those above are arranged on the non-tiltable second operation portion 220. Home key 204 is arranged near the boundary between the first and second operation portions 200 and 220.

These three keys are arranged in the order of home key 204, energy saving key 224 and power key 222 from left to right along the longitudinal direction of operation console 110. Further, these three keys are arranged such that, along the direction orthogonal to the longitudinal direction of operation console 110, home key 204 is arranged at a position closest to the user who operates the keys, and power key 222 and energy saving key 224 are arranged on the deeper side. Power key 222 and energy saving key 224 are arranged apart by the distance d1 from home key 204. Specifically, on the plan view of FIG. 13, a line 502 passing through the centers of power key 222 and energy saving key 224 is apart by a distance d1 from the line passing through the center of home key 204 and parallel to the longitudinal direction of operation console 110. Specifically, power key 222 and energy saving key 224 are arranged at positions away from the operating user than home key 204.

Since the operation keys are arranged in view of similarity/difference of operational sensations, the user does not feel any strangeness when he/she operates the keys. Particularly, since home key 204, which is a touch key, is arranged on the tiltable first operation portion 200 on which touch-panel display is arranged and mechanical keys used for relatively important keys (power key 222 and energy saving key 224) are arranged on the non-tiltable, fixed second operation portion 220, the user can easily understand the roles of the keys and, hence, erroneous operations of important keys can be prevented.

Figure 14:
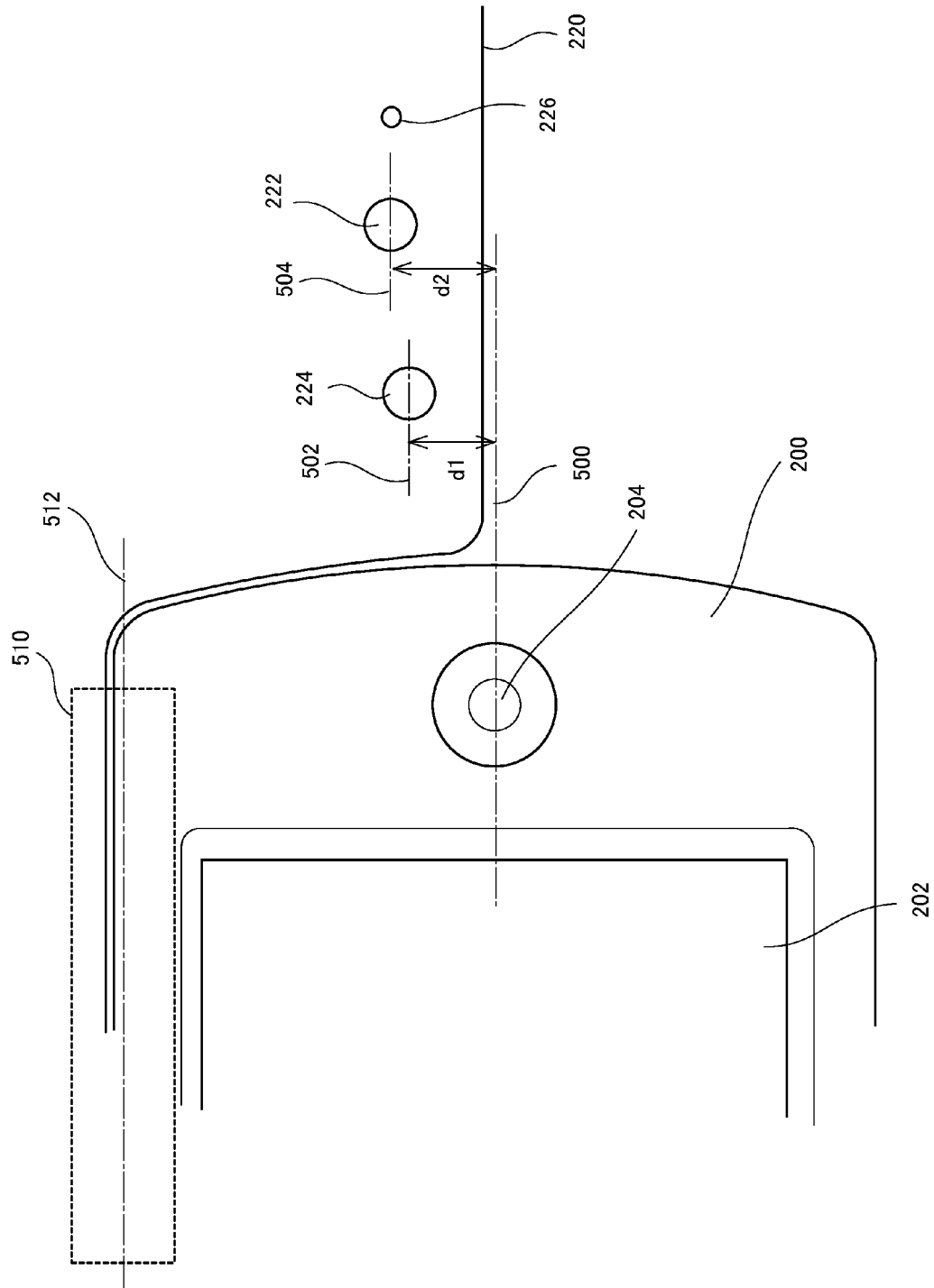
FIG. 14 is a plan view showing an arrangement of operation keys on the operation console different from FIG. 13.

Power key 222 may be arranged further deeper than energy saving key 224 as shown in FIG. 14. In FIG. 14, home key 204, energy saving key 224 and power key 222 are arranged in this order from the side closest to the user to the deeper side along the direction orthogonal to the longitudinal direction of operation console 110. Specifically, the line 504 passing through the center of power key 222 and parallel to the longitudinal direction of operation console 110 is apart by a distance d2 from line 500. Here, d1<d2, and d2−d1 is smaller than d1. Specifically, energy saving key 224 and power key 222 are both arranged at positions away from the operating user than home key 204, and power key 222 is arranged slightly further away from the operating user than energy saving key 224.

Though mechanical keys are used for power key 222 and energy saving key 224 in the example above, mechanical keys may be used for other keys and these keys may be arranged on the operation console 110. In that case, it is preferred that the mechanical keys are arranged on the second operation portion 220 near the boundary to the first operation portion 200, in accordance with the degree of importance including power key 222 and energy saving key 224.

Though an example in which operation console 110 has a tilting mechanism has been described above, it is not limiting. The first operation portion 200 may not be tilted, if the first and second operation portions are formed as separate bodies with recognizable boundary therebetween.

Third Embodiment

The method of arranging keys of different operational sensations in different areas is not limited to the second embodiment described above. In the operation console in accordance with the third embodiment of the present invention, keys of similar operational sensations are arranged area by area, and the operation console is provided with some objects to clearly distinguish the areas from each other.

Similar to the first embodiment, the operation console in accordance with the third embodiment is mounted on an image processing apparatus. The characteristic is in the key arrangement different from those of the operation consoles in accordance with the first and second embodiments.

Figure 15:
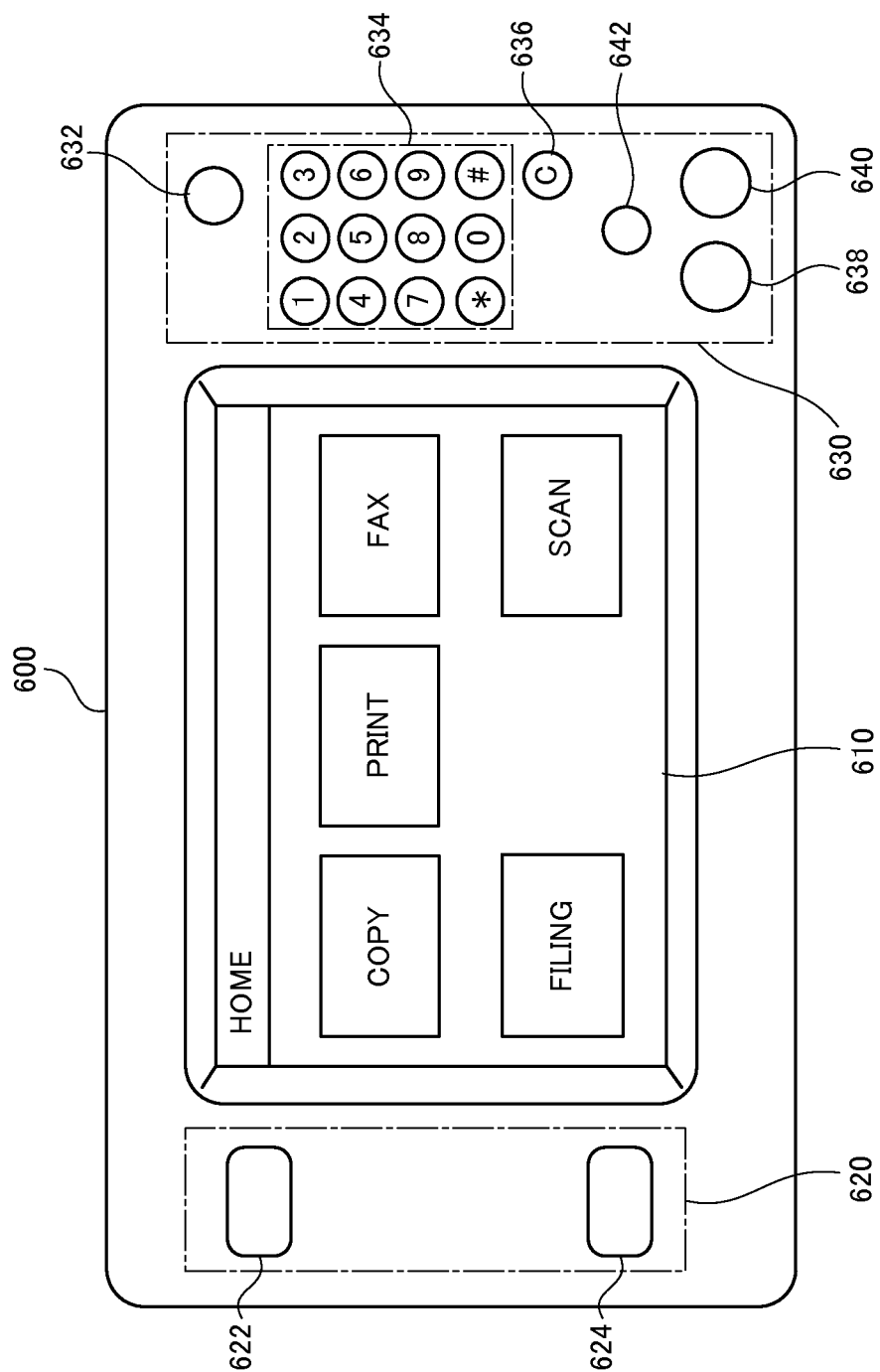
FIG. 15 is a plan view showing an arrangement of operation keys on the operation console in accordance with a third embodiment of the present invention.

Referring to FIG. 15, an operation console 600 in accordance with the present embodiment has a touch-panel display 610 arranged at the center, and various keys are arranged on the left and right sides thereof. As in the first and second embodiments, touch-panel display 610 includes a display panel formed, for example, of a liquid crystal panel, and a touch-panel. As in the first and second embodiments, a capacitance type, infrared interruption type, surface acoustic wave type or resistive film type touch-panel may be used as the touch-panel.

In the capacitance type panel, an electric field is formed over the entire surface of touch-panel and a change in surface charge caused by a touch by a finger (dielectric body) is detected and thereby a touched position is specified. The capacitance type is advantageous in that it has high response speed and high resolution. On the other hand, it detects a light touch of a finger or detects a finger that comes close to the panel while the panel is not substantially displaced (deformed) by the operation. Therefore, this type is prone to an operational error or a detection error.

In resistive film type panel, parallel wires are provided on two glass surfaces or film surfaces that are arranged in intersecting directions, and a voltage is applied to the wires. When a portion is touched, that portion is rendered conductive and, by detecting a change in resistance value caused by the conduction, the touched position is specified. The resistive film type is advantageous in that it allows operation by a pen or gloved fingers and that it is relatively inexpensive. The resistive film type panel requires operation with higher force than the capacitance type one, and it deforms to some extent by the operation. Therefore, it is less prone to an operational error or a detection error.

As compared with the mechanical keys that will be described in the following, touch-panels of any type can be operated with weaker force and not much displaced (deformed) by the operation and, therefore, they are more prone to an operational error or a detection error.

FIG. 15 shows a home screen image displayed on touch-panel display 610. At an upper portion of the home screen image, characters "HOME" indicate that it is a home screen image, and further, software keys (COPY, PRINT, FAX, FILING and SCAN keys) for displaying settings screen images related to the functions of image processing apparatus are displayed.

On an area 620 (hereinafter referred to as left area) on the left side of touch-panel display 610 when viewed from the front side, capacitance type keys (hereinafter referred to as capacitance keys) are arranged. The capacitance keys can detect a light touch of a finger or a finger coming close as described above while they are hardly displaced (deformed) by the operation. Therefore, they are prone to an operational error or a detection error.

The capacitance keys arranged on the left area 620 are configured as shown in FIGS. 5 to 12, similar to home key 204 of the first embodiment. It is noted, however, that on the upper surface of protruding portion of the light transmitting portion forming each key (see protruding portion 330 of light transmitting portion 322 shown in FIG. 10), a figure, character or the like different from home key 204 may be formed.

Referring to FIG. 15, on left area 620, a home key 622 and a job status check key 624 are arranged. Home key 622 is to return the screen image displayed on touch-panel display 610 (switched from the basic screen image) to the basic screen image. Job status check key 624 is for checking the progress of job status such as printing, and when it is touched, information representing the progress status of the job (for example, "printing" or "waiting") is displayed on touch-panel display 610.

On an area 630 (hereinafter referred to as right area) on the right side of touch-panel display 610 when viewed from the front side, mechanical keys, in which a contact points come to be in physical contact when pressed, are arranged. Each mechanical key is characterized in that when a force is exerted, the key top gradually goes down and when it goes down by a prescribed distance, contact points come to be in physical contact and turn on. Specifically, the shape of a mechanical key changes quite recognizably when pressed and, therefore, as compared with a capacitance key, the user can well recognize the pressing operation. Therefore, as compared with the touch-panel and the capacitance keys, the mechanical keys are less prone to an operational error.

Referring to FIG. 15, an energy saving key 632, ten-keys arranged on a ten-key area 634, a clear key 636, a color copy start key 638, a monochrome copy start key 640 and a stop key 642 are arranged. Energy saving key 632 is for causing a transition of the image processing apparatus to the power saving state, or from the power saving state to the normal state. Clear key 636 is for erasing all numerals and signs entered by the ten-keys and displayed on touch-panel display 610. Stop key 642 is for stopping execution of a job.

In this manner, in accordance with the operational sensations of the keys, touch-panel keys (software keys displayed on the touch-panel display), capacitance keys and mechanical keys are arranged in separate areas, whereby it becomes easier for the user to recognize the roles (functions) of the keys, and an operation console having unity and a sophisticated look can be provided.

Figure 16:
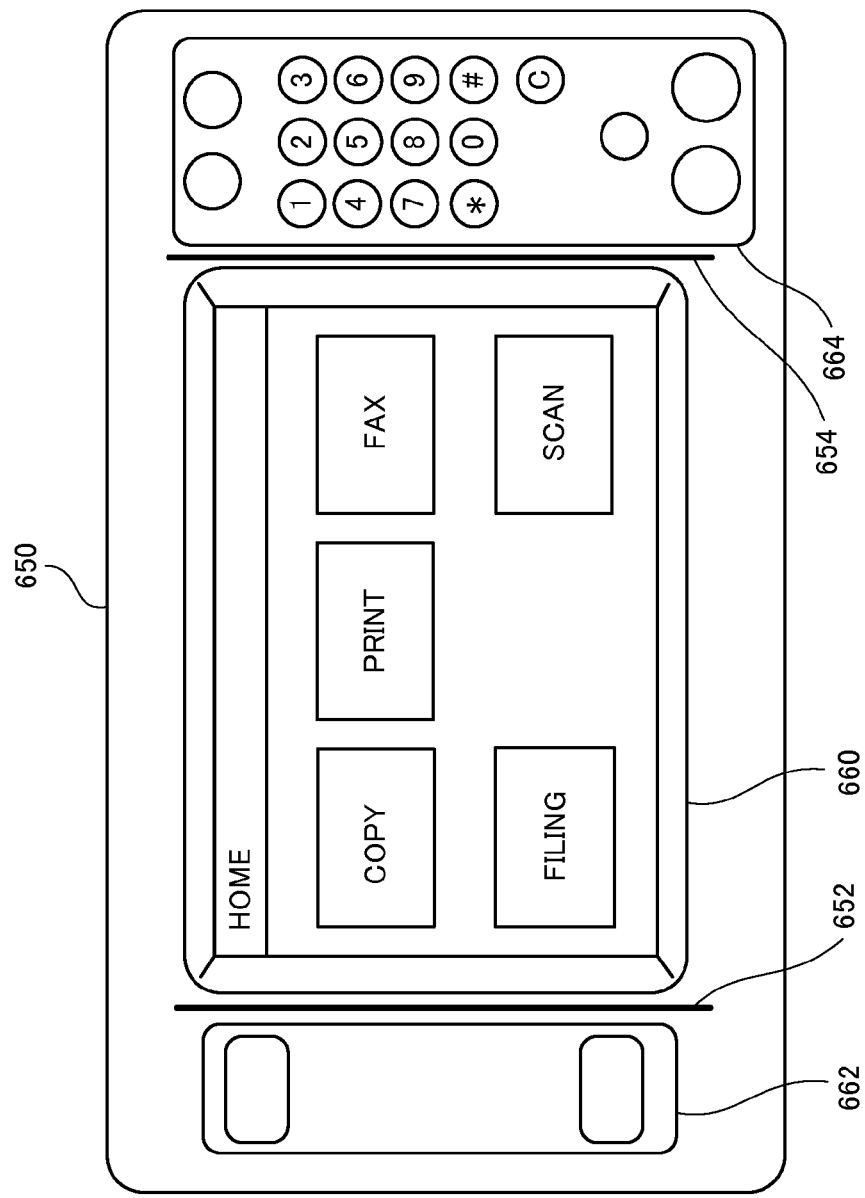
FIG. 16 is a plan view showing the operation console having partitions formed thereon.

For more clear distinction between these areas, it is preferred to provide partitions such as shown in FIG. 16. On an operation console 650 shown in FIG. 16, between touch-panel display and each of left and right areas, first and second partition lines 652 and 654 are arranged. Further, around the touch-panel display, a clear first frame 660 is formed. On the left and right areas, second and third frames 662 and 664 are formed as partitions.

By way of example, the first and second partition lines 652 and 654 and the first to third frames 660 to 664 are printed in a prescribed color or colors on the surface of operation console. These partitions may be formed as recessed portions or protruding portions by molding.

Figure 17:
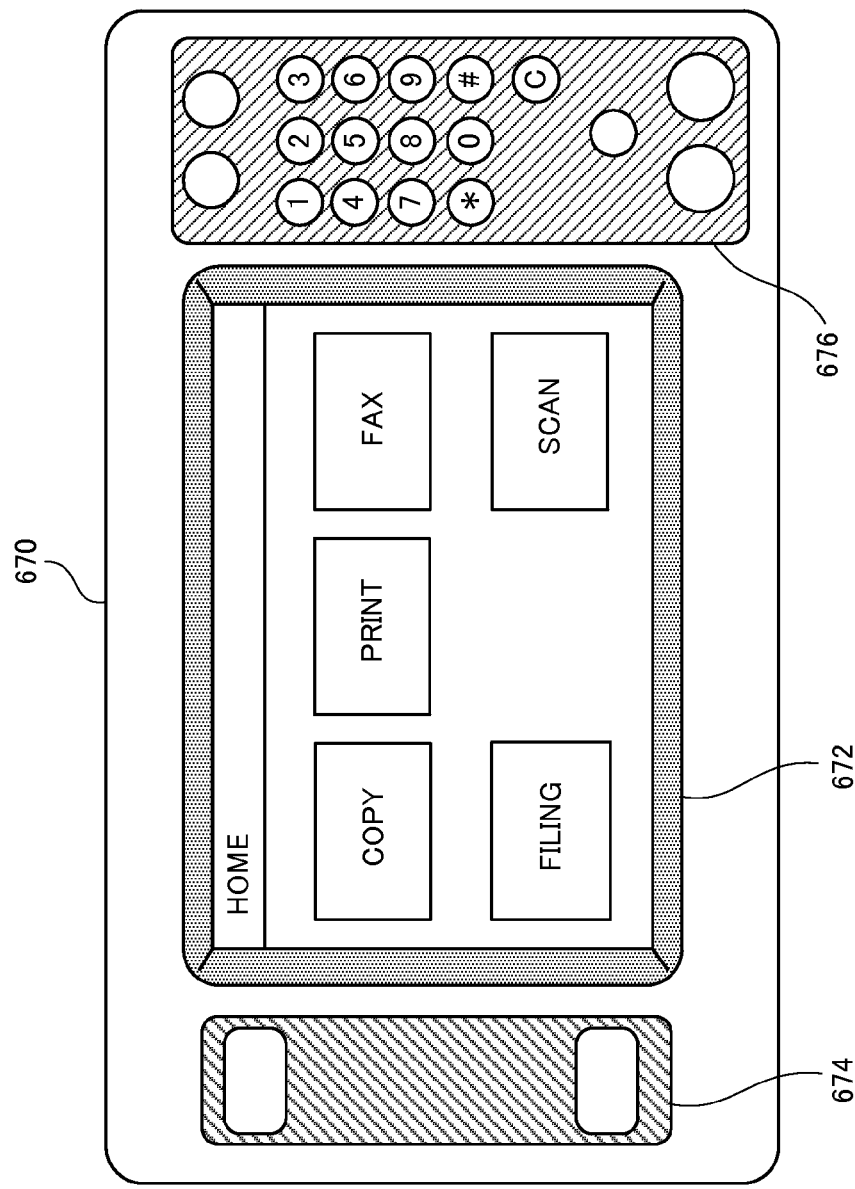
FIG. 17 is a plan view showing the operation console having partitions formed thereon, different from FIG. 16.

Though an example in which the first to third frames 660 to 664 are formed has been described above, it is not limiting. By way of example, various areas may have different colors as shown in FIG. 17. Specifically, these areas may be printed in different colors. On an operation console 670, frames for respective areas are formed and, in addition, the first to third areas 672 to 676 inside these frames are printed in different colors. This makes it easier to clearly distinguish these areas from each other. These areas may be formed by members of different colors, instead of printing in different colors.

Further, formation of partition lines, formation of frames and different coloring of areas in different colors may be appropriately combined to distinguish various areas on the operation console. By way of example, the first partition line 652 and the first frame 660 may be formed (see FIG. 16), and the third area 676 (see FIG. 17) may be printed in a color different from the first partition line 652 and the first frame 660.

Further, similar to the first operation portion 200 in accordance with the second embodiment, the operation console in accordance with the present embodiment may have a tilting mechanism allowing a change in the angle of arrangement.

Fourth Embodiment

The operation console in accordance with the fourth embodiment of the present invention will be described. As in the first embodiment, the operation console in accordance with the fourth embodiment is mounted on an image processing apparatus. It is characterized in the key arrangement different from the operation consoles in accordance with the first to third embodiments.

Figure 18:
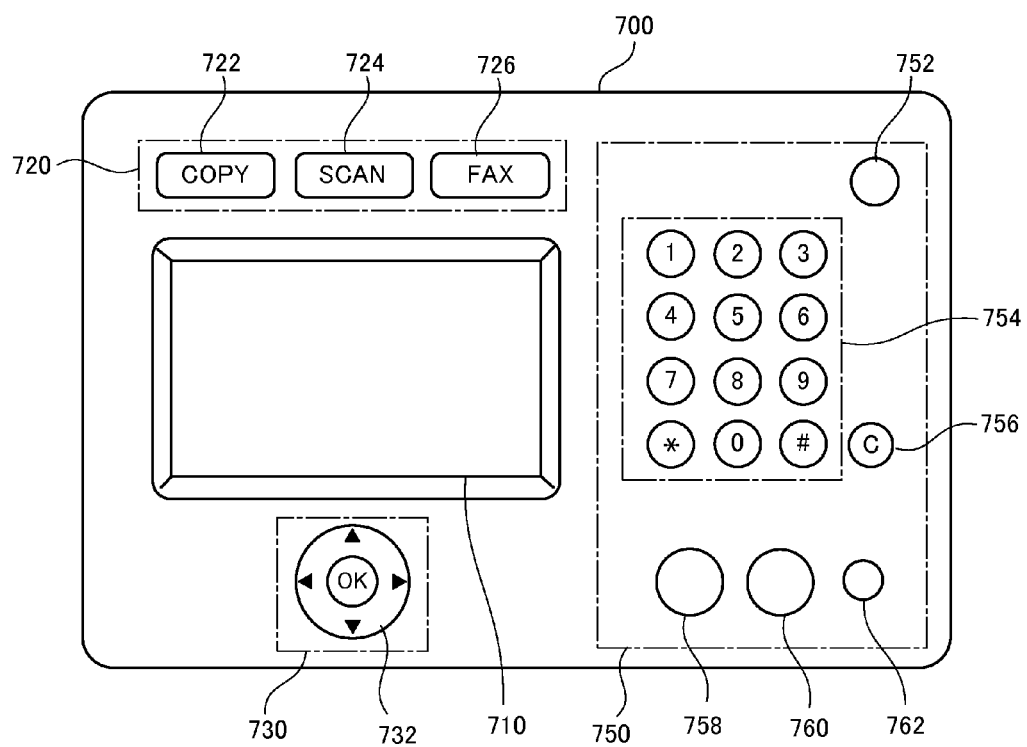
FIG. 18 is a plan view showing an arrangement of operation keys on the operation console in accordance with a fourth embodiment of the present invention.

Referring to FIG. 18, an operation console 700 in accordance with the present embodiment has various keys on the upper and lower sides as well as left and right sides of a touch-panel display 710 as a reference.

Touch-panel display 710 has, as in the first to third embodiments, a display panel formed of a liquid crystal panel or the like and a touch-panel. As in the first to third embodiments, the capacitance type, infrared interruption type, surface acoustic wave type or resistive film type touch-panel may be used for the touch-panel.

On touch-panel display 710, software keys are displayed, as in the first to third embodiments.

On an area 720 (hereinafter referred to as upper area) upper than and on an area 730 (hereinafter referred to as lower area) lower than the touch-panel display 710, capacitance keys are arranged. The capacitance keys are configured as shown in FIGS. 5 to 12, similar to home key 204 of the first embodiment. It is noted, however, that on the upper surface of protruding portion of the light transmitting portion forming each key (see protruding portion 330 of light transmitting portion 322 shown in FIG. 10), a figure, character or the like different from home key 204 is formed.

Referring to FIG. 18, on upper area 720, COPY key 722, SCAN key 724 and FAX key 726 are arranged. When these keys are touched, settings screen images of the corresponding functions are displayed on touch-panel display 710. Here, a total of six LED elements are arranged, above and below each of the COPY key 722, SCAN key 724 and FAX key 726. Between the neighboring keys, a light shielding portion (see FIG. 5) is provided to prevent leakage of light. Alternatively, a total of two LED elements may be arranged on the left side of COPY key 722 and on the right side of FAX key 726. In that case, the light shielding portion (see FIG. 5) is arranged to cover COPY key 722, SCAN key 724 and FAX key 726 as a whole, and not provided between neighboring keys.

On lower area 730, a selection key 732 is arranged. Selection key 732 is to enter an instruction of four directions, that is, up, down, left and right and to enter an instruction of selection determination, to the image processing apparatus. The instruction of up, down, left and right four directions can be given by touching the four areas having indication of triangles. The determination is done by touching the portion having the letters "OK." By way of example, it is possible for the user to select from a plurality of options displayed on touch-panel display 710, by using selection key 732.

Figure 19:
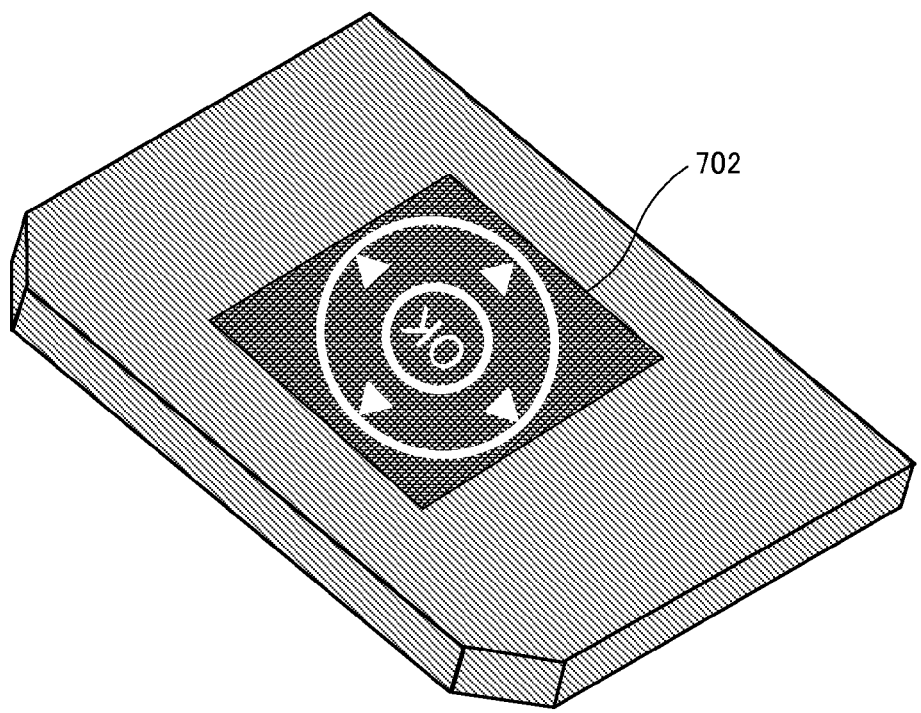
FIG. 19 is a perspective view showing the light guiding portion forming the selection key of FIG. 18.
Figure 20:
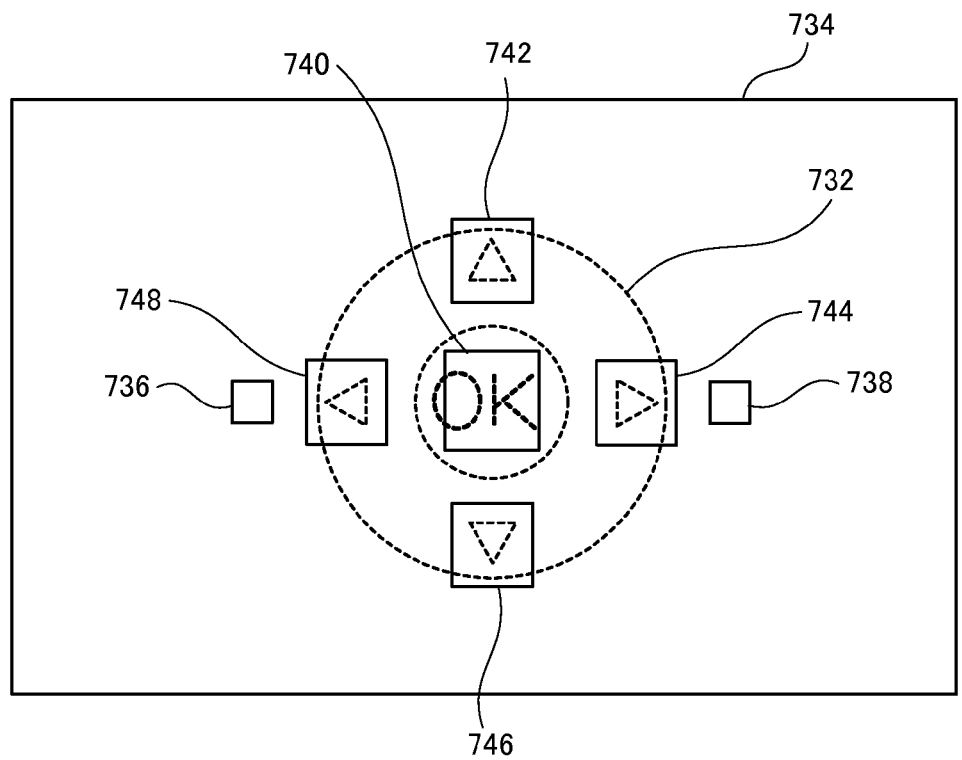
FIG. 20 is a plan view showing a circuit board forming the selection key of FIG. 18.

Similar to home key 204 of the first embodiment, selection key 732 is configured to have a light guiding portion (light transmitting portion and light shielding portion) and a circuit board, as shown in FIGS. 5 to 12. As shown in FIG. 19, at an upper surface 702 (see FIG. 10) of the protruding portion of light transmitting portion forming selection key 732, a figure (a figure representing selection key 732) different from home key 204 (see FIG. 8) is formed. The hatched portion on the upper surface 702 of the protruding portion of light transmitting portion is printed black, while unhatched portions have no prints and left transparent. Referring to FIG. 20, as in the first embodiment, on a circuit board 734 forming selection key 732, two LED elements 736 and 738 and five electrode arranging areas 740 to 748 are arranged. In FIG. 20, a figure representing the selection key 732 is drawn in dotted lines. On electrode arranging area 740, electrodes for detecting a touch to the portion where "OK" is indicated are arranged, and on four electrode arranging areas 742 to 748, switches for detecting a touch to the four areas having triangles indicated thereon are arranged. The arrangement of LEDs are not limited to that shown in FIG. 20, and one, or three or more LED elements may be arranged. By way of example, in place of two LED elements 736 and 738, or in addition to the two LED elements 736 and 738, two LED elements may be arranged near the outside of electrode arranging areas 742 and 746.

On the right side area 750 of touch-panel display 710, mechanical keys are arranged. In FIG. 18, an energy saving key 752, ten keys arranged on a ten-key area 754, a clear key 756, a color copy start key 758, a monochrome copy start key 760, and a stop key 762 are arranged. Energy saving key 752 is to cause transition of image processing apparatus to a power saving state or from the power saving state to a normal state. Clear key 756 is for erasing all numerals and signs entered by the ten-keys and displayed on touch-panel display 710. Stop key 762 is for stopping execution of a job.

In this manner, in accordance with the operational sensations of the keys, touch-panel keys (software keys displayed on the touch-panel display), capacitance keys and mechanical keys are arranged in separate areas, whereby it becomes easier for the user to recognize the roles (functions) of the keys, and an operation console having unity and a sophisticated look can be provided.

Figure 21:
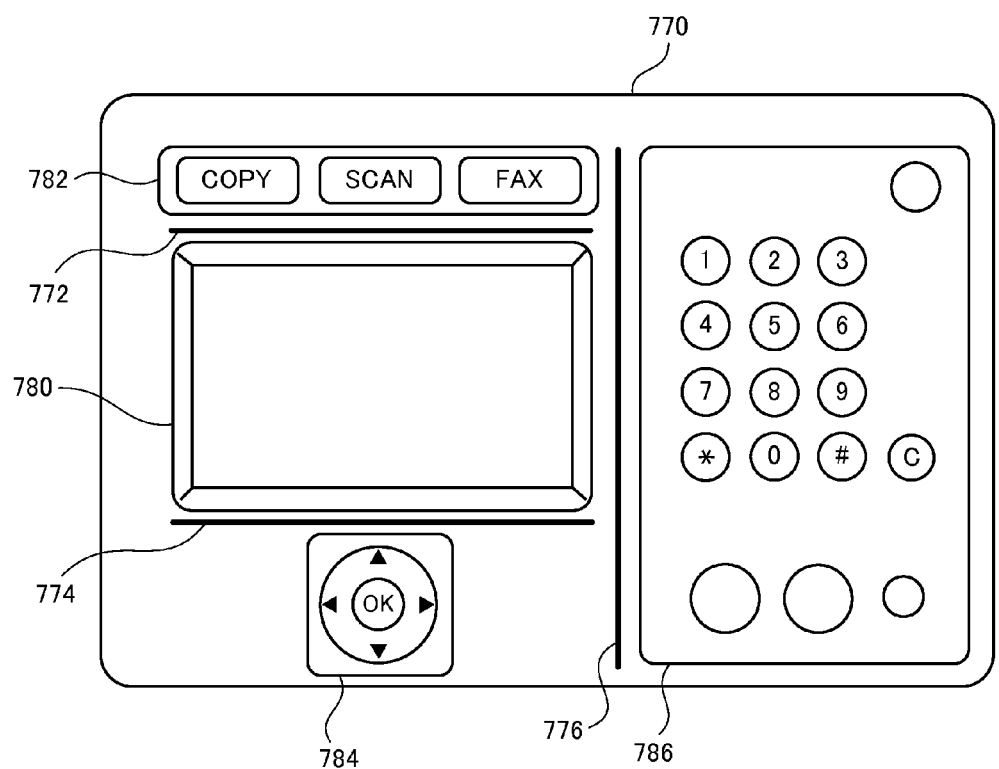
FIG. 21 is a plan view showing an operation console having partitions formed thereon.

For clearer distinction between these areas, it is preferred to provide partitions such as shown in FIG. 21. On an operation console 770 shown in FIG. 21, between touch-panel display and each of upper and lower areas and the right area, first, second and third partition lines 772, 774 and 776 are arranged. Further, around the touch-panel display, a clear first frame 780 is formed. For the upper, lower and right areas, the second, third and fourth frames 782, 784 and 786 are formed as partitions, respectively.

By way of example, the first to third partition lines 772 to 776 and the first to fourth frames 780 to 786 are printed in a prescribed color or colors on the surface of operation console. These partitions may be formed as recessed portions or protruding portions by molding.

Figure 22:
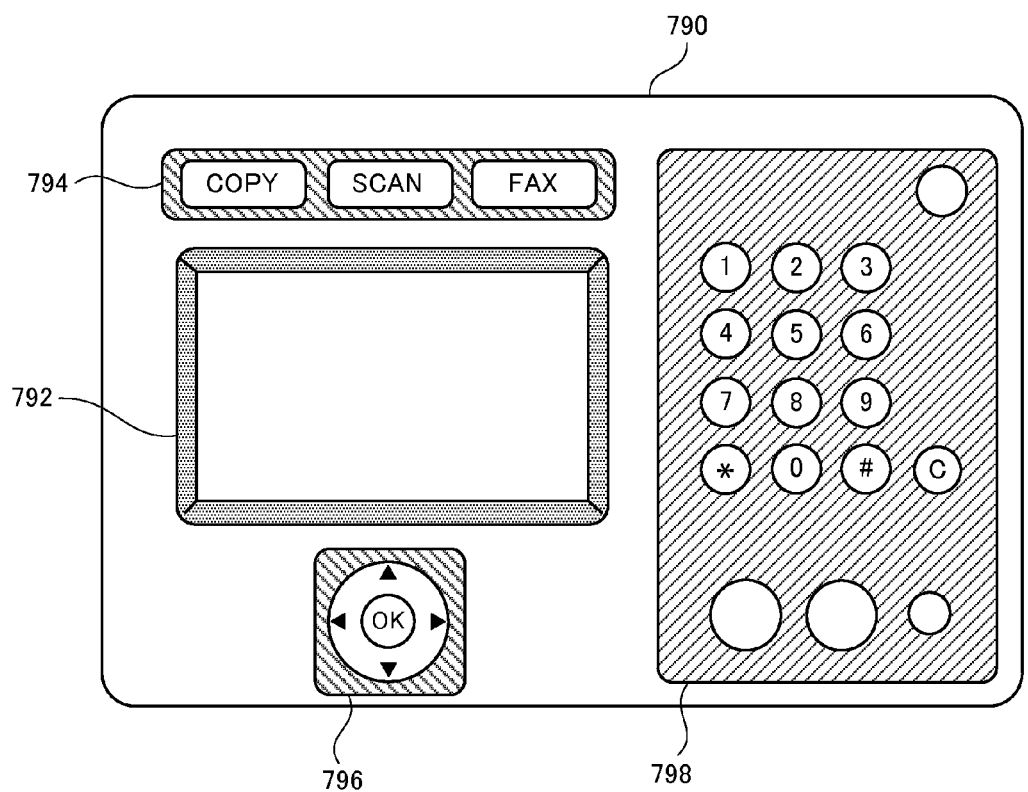
FIG. 22 is a plan view showing an operation console having partitions formed thereon, different from FIG. 21.

Though an example in which first to fourth frames 780 to 786 are formed has been described in the foregoing, it is not limiting. By way of example, respective areas may be printed in different colors as shown in FIG. 22. On operation console 790, frames of each area are formed and, in addition, first to fourth areas 792 to 798 inside the frames are colored in different colors. Therefore, these areas can more clearly be distinguished. Different areas may be formed of members of different colors, rather than printing in different colors.

Further, formation of partition lines, frames and coloring of different colors of respective areas may be appropriately combined to distinguish areas on the operation console. For example, the first and second partition lines 772 and 774 and first frame 780 may be formed (see FIG. 21), and inside of the fourth area 798 (see FIG. 22) may be printed in a color different from that of first and second partition lines 772 and 774 and of the first frame 780.

Further, similar to the first operation portion 200 in accordance with the first embodiment, the operation console in accordance with the present embodiment may have the tilting mechanism to enable change in the angle of arrangement.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

According to the present invention, when the user operates keys of different touching sensations, he/she can easily understand the roles (functions) of the keys without feeling strangeness. Further, the light emitted from the light source doe not leak from the side surfaces, and it can be radiated efficiently from the upper surface of light transmitting portion. Therefore, different from a conventional example in which portions surrounding the operation key are dimly lit by the leaked light, the operation console comes to have a high-class look.

REFERENCE SIGNS LIST 100 image processing apparatus
110 operation console
112 image reading unit
114 automatic document feeder
116 image processing unit
118 paper feed unit
120 paper discharge tray
200 first operation portion
202 touch-panel display
204 home key
220 second operation portion
222 power key
224 energy saving key
226 LED lamp
300 panel
302 recessed portion
310 circuit board
312, 314 LED element
316 electrode arranging area
320 light guiding portion
322 light transmitting portion
324 light shielding portion
326, 328 LED element receiving portion
330 protruding portion

The invention claimed is:

1. An operation console mounted on an image forming apparatus, the operation console comprising:
   a touch-operation portion, wherein
   said touch-operation portion includes a first touch-operation portion provided with a touch-panel display that displays a touch-panel key, a second touch-operation portion provided with a capacitance key, and a third touch-operation portion provided with a mechanical key;
   said touch-panel key is a function setting key that sets a function of said image forming apparatus, and is displayed on said touch-panel display;
   said capacitance key is a screen transition key that causes transition of a screen displayed on said touch-panel display to a basic screen that allows at least selection of a copy function;
   said mechanical key is a power key that turns on said image forming apparatus; and
   said screen transition key is spaced from said touch-panel display in a widthwise direction of said operation console viewed from an operator operating said operation console, and, in a depth direction of said operation console viewed from the operator operating said operation console, at a central portion of said touch-panel display.

2. An image forming apparatus, comprising:
   the operation console according to claim 1; and
   an image forming unit that forms an image on a sheet of recording paper; wherein
   in response to an instruction of image formation entered from said operation console, said image forming unit is caused to execute the instructed image formation.

3. The operation console according to claim 1, wherein said second touch operation portion and said third touch-operation portion are arranged, in the depth direction of said operation console viewed from the operator operating said operation console, within a length in said depth direction of said first touch-operation portion.

4. The operation console according to claim 1, wherein a central portion of said capacitance key of said second touch-operation portion is spaced from said touch-panel display in the widthwise direction of said operation console viewed from the operator operating said operation console, and, in the depth direction of said operation console viewed from the operator operating said operation console, substantially at the central portion of said touch-panel display.

5. The operation console according to claim 1, wherein said mechanical key further includes an energy saving key that causes transition of said image forming apparatus to a power saving state.

6. The operation console according to claim 1, wherein said capacitance key is closer to said first touch-operation portion than said mechanical key.

7. The operation console according to claim 1, wherein the mechanical key of said third touch-operation portion further includes an energy saving key that causes transition of said image forming apparatus to a power saving state; and
said power key is farther than said energy saving key in the depth direction of said operation console as viewed from the operator operating said operation console.

8. The operation console according to claim 1, wherein said touch-panel display displays a copy executing key that causes said image forming apparatus to execute a copy operation.

9. The operation console according to claim 1, wherein said touch-panel display has an area larger than an area of said third touch-operation portion provided with the mechanical key which is the power key that turns on said image forming apparatus.

10. The operation console according to claim 1, wherein said touch-panel key of said first touch-operation portion and said capacitance key of said second touch-operation portion have rectangular shapes; and
said mechanical key of said third touch-operation portion has a circular shape.

11. The operation console according to claim 1, further comprising:
a first operation portion that is rotatable with respect to said image forming apparatus, and a second operation portion that is fixed with respect to said image forming apparatus; wherein
said first touch-operation portion, said second touch-operation portion, and said third touch-operation portion are arranged such that a border is positioned in between said first operation portion and said second operation portion; and
said first touch-operation portion and said second touch-operation portion are adjacent to each other.

12. The operation console according to claim 11, wherein said first touch-operation portion and said second touch-operation portion are arranged on said first operation portion.

13. The operation console according to claim 11, wherein said third touch-operation portion is arranged on said second operation portion.

14. The operation console according to claim 11, wherein an axis that allows rotation of said first operation portion is deeper than said touch-panel display in the depth direction of said operation console as viewed from the operator operating said operation console.

15. The operation console according to claim 1, wherein said first touch operation portion is arranged on a left side of said second touch operation portion and said third touch operation portion is arranged on a right side of said second touch operation portion, along the widthwise direction of said operation console.

16. The operation console according to claim 1, wherein said first touch operation portion and said second touch operation portion are rotatable with respect to said image forming apparatus.

* * * * *